US012652548B2

(12) United States Patent
Manolakos et al.

(10) Patent No.: US 12,652,548 B2
(45) Date of Patent: Jun. 9, 2026

(54) CUSTOMIZATION FEATURE VECTOR FEEDBACK FOR MACHINE LEARNING COMPONENTS IN WIRELESS COMMUNICATION

(71) Applicant: QUALCOMM Incorporated, San Diego, CA (US)

(72) Inventors: Alexandros Manolakos, Escondido, CA (US); June Namgoong, San Diego, CA (US); Naga Bhushan, San Diego, CA (US); Taesang Yoo, San Diego, CA (US); Pavan Kumar Vitthaladevuni, San Diego, CA (US); Jay Kumar Sundararajan, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 18/006,693

(22) PCT Filed: Jul. 30, 2021

(86) PCT No.: PCT/US2021/071077
§ 371 (c)(1),
(2) Date: Jan. 24, 2023

(87) PCT Pub. No.: WO2022/056505
PCT Pub. Date: Mar. 17, 2022

(65) Prior Publication Data
US 2023/0276261 A1 Aug. 31, 2023

(30) Foreign Application Priority Data
Sep. 11, 2020 (GR) ................................ 20200100555

(51) Int. Cl.
H04W 24/10 (2009.01)
G06N 3/098 (2023.01)
H04W 24/02 (2009.01)

(52) U.S. Cl.
CPC ............ *H04W 24/02* (2013.01); *G06N 3/098* (2023.01); *H04W 24/10* (2013.01)

(58) Field of Classification Search
CPC . H04W 72/23; H04W 72/54; H04W 72/0446; H04W 72/535; H04W 52/0212;
(Continued)

(56) References Cited

U.S. PATENT DOCUMENTS 10,980,034 B2 * 4/2021 Yang ..................... H04B 7/0626
2011/0165846 A1 * 7/2011 Zheng ..................... H04L 1/003
455/67.11
(Continued)

FOREIGN PATENT DOCUMENTS

CN          107210801 A  * 9/2017 ............. H04B 17/24
WO    WO-2020180221 A1   9/2020
(Continued)

OTHER PUBLICATIONS

International Search Report and Written Opinion—PCT/US2021/071077—ISA/EPO—Jan. 24, 2022.
(Continued)

*Primary Examiner* — Quan M Hua
(74) *Attorney, Agent, or Firm* — Harrity & Harrity, LLP

(57) ABSTRACT
Various aspects of the present disclosure generally relate to wireless communication. In some aspects, a client may receive a customization feature vector feedback configuration associated with a reporting procedure for reporting updates corresponding to at least one customization feature vector that is based at least in part on one or more features associated with an environment of the client. The client may
(Continued)

determine an update corresponding to the at least one customization feature vector using a machine learning component. The client may transmit the update based at least in part on the customization feature vector feedback configuration. Numerous other aspects are provided.

31 Claims, 13 Drawing Sheets

(58) Field of Classification Search
CPC ......... H04W 72/0457; H04W 72/0473; H04W 72/1273; H04W 72/232; H04W 24/10; H04W 72/21; H04W 72/0453; H04W 24/08; H04W 76/27; H04W 80/08; H04W 72/541; H04W 76/11; H04W 48/10; H04W 48/12; H04W 48/16; H04W 56/001; H04W 64/00; H04W 64/006; H04W 72/046; H04W 72/1268; H04W 72/30; H04W 74/02; H04W 74/0808; H04W 76/28; H04W 80/02; H04W 88/02; H04W 88/08; H04W 52/0206
See application file for complete search history.

(56) References Cited

U.S. PATENT DOCUMENTS

| | | | |
|---|---|---|---|
| 2013/0272250 A1 | 10/2013 | Shimezawa et al. | |
| 2014/0036704 A1* | 2/2014 | Han | H04L 45/306 |
| | | | 370/252 |
| 2015/0195075 A1 | 7/2015 | Gorokhov | |
| 2020/0146064 A1* | 5/2020 | Oh | H04W 74/0808 |
| 2021/0351885 A1* | 11/2021 | Chavva | G06N 3/08 |
| 2023/0012043 A1* | 1/2023 | Tian | G06N 3/0495 |

FOREIGN PATENT DOCUMENTS

| | | | | |
|---|---|---|---|---|
| WO | WO-2020214168 A1 * | 10/2020 | | H04B 7/0695 |
| WO | WO-2022040048 A1 * | 2/2022 | | H04L 69/28 |

OTHER PUBLICATIONS

Partial International Search Report—PCT/US2021/071077—ISA/ EPO—Dec. 1, 2021.

* cited by examiner

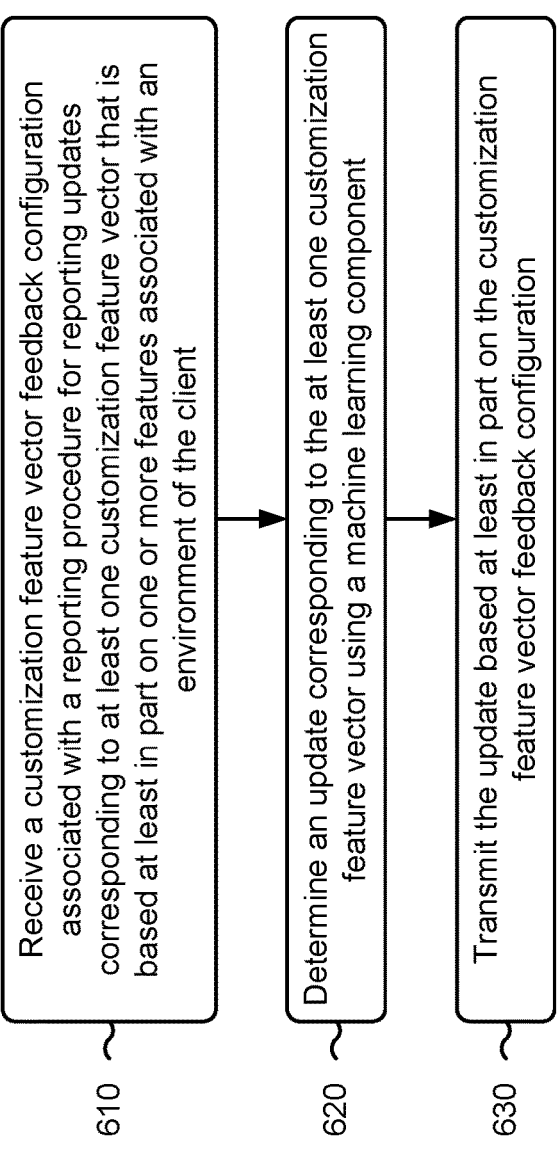

Receive a customization feature vector feedback configuration associated with a reporting procedure for reporting updates corresponding to at least one customization feature vector that is based at least in part on one or more features associated with an environment of the client

610

Determine an update corresponding to the at least one customization feature vector using a machine learning component

620

Transmit the update based at least in part on the customization feature vector feedback configuration

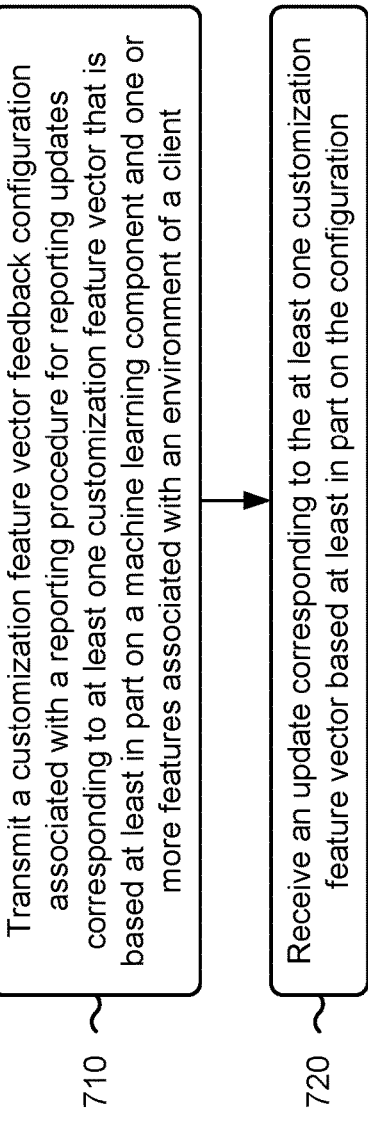

700

710 Transmit a customization feature vector feedback configuration associated with a reporting procedure for reporting updates corresponding to at least one customization feature vector that is based at least in part on a machine learning component and one or more features associated with an environment of a client 720 Receive an update corresponding to the at least one customization feature vector based at least in part on the configuration

FIG. 7

CUSTOMIZATION FEATURE VECTOR FEEDBACK FOR MACHINE LEARNING COMPONENTS IN WIRELESS COMMUNICATION

CROSS-REFERENCE TO RELATED APPLICATIONS

This Patent Application is a 371 national stage of PCT Application No. PCT/US2021/071077 filed on Jul. 30, 2021, entitled "CUSTOMIZATION FEATURE VECTOR FEED-BACK FOR MACHINE LEARNING COMPONENTS IN WIRELESS COMMUNICATION." which claims priority to Greece Patent Application Serial No. 20200100555, filed on Sep. 11, 2020, entitled "CUSTOMIZATION FEATURE VECTOR FEEDBACK FOR MACHINE LEARNING COMPONENTS IN WIRELESS COMMUNICATION," and assigned to the assignee hereof. The disclosure of the prior Applications are considered part of and is are incorporated by reference into this Patent Application.

FIELD OF THE DISCLOSURE

Aspects of the present disclosure generally relate to wireless communication and to techniques and apparatuses for supporting machine learning components.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LIE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a client includes receiving a customization feature vector feedback configuration associated with a reporting procedure for reporting updates corresponding to at least one customization feature vector that is based at least in part on one or more features associated with an environment of the client. The method includes determining an update corresponding to the at least one customization feature vector using a machine learning component. The method includes transmitting the update based at least in part on the customization feature vector feedback configuration.

In some aspects, a method of wireless communication performed by a server includes transmitting a customization feature vector feedback configuration associated with a reporting procedure for reporting updates corresponding to at least one customization feature vector that is based at least in part on a machine learning component and one or more features associated with an environment of a client. The method includes receiving an update corresponding to the at least one customization feature vector based at least in part on the configuration.

In some aspects, a client for wireless communication includes a memory and one or more processors coupled to the memory. The one or more processors are configured to receive a customization feature vector feedback configuration associated with a reporting procedure for reporting updates corresponding to at least one customization feature vector that is based at least in part on one or more features associated with an environment of the client. The one or more processors are configured to determine an update corresponding to the at least one customization feature vector using a machine learning component. The one or more processors are configured to transmit the update based at least in part on the customization feature vector feedback configuration.

In some aspects, a server for wireless communication includes a memory and one or more processors coupled to the memory. The one or more processors are configured to transmit a customization feature vector feedback configuration associated with a reporting procedure for reporting updates corresponding to at least one customization feature vector that is based at least in part on a machine learning component and one or more features associated with an environment of a client. The one or more processors are configured to receive an update corresponding to the at least one customization feature vector based at least in part on the configuration.

In some aspects, a non-transitory computer-readable medium storing a set of instructions for wireless communication includes one or more instructions that, when executed by one or more processors of a client, cause the client to receive a customization feature vector feedback configuration associated with a reporting procedure for reporting updates corresponding to at least one customization feature vector that is based at least in part on one or more features associated with an environment of the client. The one or more instructions cause the client to determine an update corresponding to the at least one customization feature vector using a machine learning component. The one or more instructions cause the client to transmit the update based at least in part on the customization feature vector feedback configuration.

In some aspects, a non-transitory computer-readable medium storing a set of instructions for wireless communication includes one or more instructions that, when executed by one or more processors of a server, cause the server to transmit a customization feature vector feedback configuration associated with a reporting procedure for reporting updates corresponding to at least one customization feature vector that is based at least in part on a machine learning component and one or more features associated with an environment of a client. The one or more instructions cause the server to receive an update corresponding to the at least one customization feature vector based at least in part on the configuration.

In some aspects, an apparatus for wireless communication includes means for receiving a customization feature vector feedback configuration associated with a reporting procedure for reporting updates corresponding to at least one customization feature vector that is based at least in part on one or more features associated with an environment of the client. The apparatus includes means for determining an update corresponding to the at least one customization feature vector using a machine learning component. The apparatus includes means for transmitting the update based at least in part on the customization feature vector feedback configuration.

In some aspects, an apparatus for wireless communication includes means for transmitting a customization feature vector feedback configuration associated with a reporting procedure for reporting updates corresponding to at least one customization feature vector that is based at least in part on a machine learning component and one or more features associated with an environment of a client. The apparatus includes means for receiving an update corresponding to the at least one customization feature vector based at least in part on the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6 and 7 are diagrams illustrating example processes associated with customization feature vector feedback for machine learning components in wireless communication, in accordance with the present disclosure.

DETAILED DESCRIPTION

Figure 1:
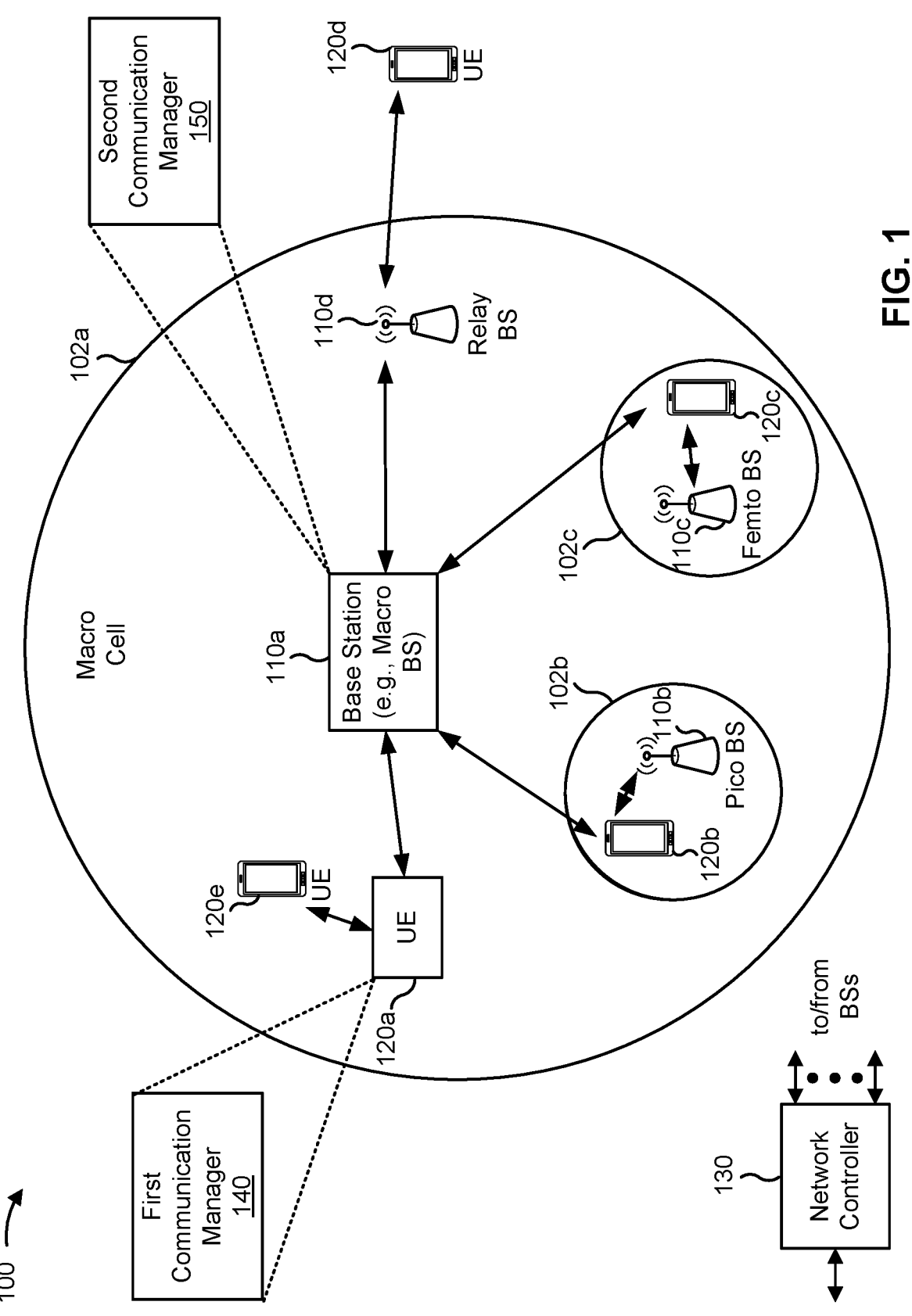
FIG. 1 is a diagram illustrating an example of a wireless network, in accordance with the present disclosure.

A client operating in a network may report information to a server. The information may include information associated with received signals and/or positioning information, among other examples. For example, a client may perform measurements associated with reference signals and report the measurements to a server. In some examples, the client may measure reference signals during a beam management process for channel state feedback (CSF), may measure received power of reference signals from a serving cell and/or neighbor cells, may measure signal strength of inter-radio access technology (e.g., WiFi) networks, and/or may measure sensor signals for detecting locations of one or more objects within an environment. However, reporting information to the server may consume communication and/or network resources.

To mitigate consumption of resources, a client (e.g., a UE, a base station, a transmit receive point (TRP), a network device, a low-earth orbit (LEO) satellite, a medium-earth orbit (MEO) satellite, a geostationary earth orbit (GEO) satellite, and/or a high elliptical orbit (HEO) satellite) may use one or more machine learning components (e.g., neural networks) that may be trained to learn dependence of measured qualities on individual parameters, isolate the measured qualities through various layers of the one or more machine learning components (also referred to as "operations"), and compress measurements in a way that limits compression loss. The client may transmit the compressed measurements to the server (e.g., a TRP, another UE, and/or a base station). The server may decode the compressed measurements using one or more decompression operations and reconstruction operations associated with one or more machine learning components. The one or more decompression and reconstruction operations may be based at least in part on a set of features of the compressed data set to produce reconstructed measurements. The server may perform a wireless communication action based at least in part on the reconstructed measurements.

In some cases, machine learning components may be trained using federated learning. Federated learning is a machine learning technique that enables multiple clients to collaboratively learn machine learning models based on training data, while the server does not collect the training data from the clients. Federated learning techniques may involve one or more global neural network models trained from data stored on multiple clients. For example, in a Federated Averaging algorithm, the server sends the neural network model to the clients. Each client trains the received neural network model using its own data and sends back an updated neural network model to the server. The server averages the updated neural network models from the clients to obtain a new neural network model.

However, in some cases, some clients may be operating in different scenarios than other clients (e.g. indoor/outdoor, stationary in a coffee shop/mobile on a highway, and/or the like). In some cases, different clients may be subject to different implementation aspects (e.g. different form factors, different RF impairments, and/or the like). As a result, in some examples, finding a neural network model that works well on all the devices in a federated learning network in terms of physical layer link performance may be difficult.

To provide and train personalized machine learning components adapted for respective clients, machine learning components may be used to determine customization feature vectors that may be used as input to other machine learning components. In some cases, for example, a pair of machine learning components may be used by a client. The first machine learning component may be configured to extract features about an environment of the client to determine a customization feature vector. The customization feature vector may be used to condition the second machine learning component to work well in the perceived environment. The customization feature vector and an observed wireless communication vector may be provided as input to the second machine learning component, which may be configured to perform a wireless communication task such as, for example, by providing a latent vector. The client may provide the customization feature vector and the latent vector to the server, which may use a machine learning component corresponding to the second machine learning component to recover the observed wireless communication vector.

In some cases, the first machine learning component may be learned and/or updated less frequently than the second machine learning component. For example, the first machine learning component may be configured to determine a customization feature vector based at least in part on an observed environmental vector associated with the client. The observed environmental vector may include elements that do not change or that change infrequently (e.g., client identifiers, positioning information associated with an unmoving client, antenna identifiers, and other infrequency changing environmental information). As a result, the customization feature vector may change infrequently and feeding the customization feature vector back to the server each time a latent vector is provided to the server may result in unnecessary consumption of communication resources.

Aspects of the techniques and apparatuses described herein may facilitate customization feature vector feedback for machine learning components in wireless communication. In some aspects, a client may receive a customization feature vector feedback configuration associated with a reporting procedure for reporting updates corresponding to at least one customization feature vector.

The client may determine an update corresponding to the at least one customization feature vector using a machine learning component and may transmit the update based at least in part on the customization feature vector feedback configuration. The customization feature vector feedback configuration may configure the client to provide updates in a manner that reduces consumption of communication resources. In this way, aspects described herein may facilitate use of machine learning components without increasing resource consumption unnecessarily. Aspects of the techniques described herein may be used for any number of cross-node machine learning challenges including, for example, facilitating channel state feedback, facilitating positioning of a client, and/or learning of modulation and/or waveforms for wireless communication.

A machine learning component is a component (e.g., hardware, software, or a combination thereof) of a client that performs one or more machine learning procedures. A machine learning component may include, for example, hardware and/or software that may learn to perform a procedure without being explicitly trained to perform the procedure. A machine learning component may include, for example, a feature learning processing block and/or a representation learning processing block. A machine learning component may include one or more neural networks. A neural network may include, for example, an autoencoder.

In some aspects, a machine learning component may be configured to take an observed environmental vector as input and provide a customization feature vector as output. An observed environmental vector may include an array of observed values associated with one or more features of an environment of a client. An environment of a client may include any characteristic associated with the client that may affect an operation of the client, a signal received by the client, and/or a signal transmitted by the client. An operation of the client may include any operation that may be performed on, or in connection with, any type of information. An operation of the client may include, for example, receiving a signal, decoding a signal, demodulating a signal, processing a signal, encoding a signal, modulating a signal, and/or transmitting a signal. In some aspects, the one or more features of the environment of the client may include characteristics of the client, large scale channel characteristics, channel information, signal information, and/or image data, among other examples. A customization feature vector may be the output of a machine learning component that takes the observed environmental vector as input. The customization feature vector may include an array of values associated with one or more features associated with an environment of the client.

In some aspects, a machine learning component may be configured to determine a latent vector based at least in part on an observed wireless communication vector. In some aspects, the observed wireless communication vector and the latent vector may be associated with a wireless communication task. The observed wireless communication vector may include an array of observed values associated with one or more measurements obtained in connection with a wireless communication. In some aspects, for example, the wireless communication task may include determining channel state feedback (CSF), determining positioning information associated with the client, determining a modulation associated with a wireless communication, and/or determining a waveform associated with a wireless communication. The latent vector h is the output of a machine learning component that takes the observed wireless communication vector as input. The latent vector may include an array of hidden values associated with one or more aspects of the observed communication vector.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Various aspects may include one or more clients that may communicate with one or more servers. Clients may include software and/or hardware configured to perform one or more operations and to communicate with one or more servers. Servers may include software and/or hardware configured to perform one or more operations and to communicate with one or more clients. Clients and/or servers may be, include, be included in, and/or be implemented on any number of different types of computing devices such as, for example, network devices (e.g., wireless network devices and/or wired network devices), portable computers, laptops, tablets, workstations, personal computers, controllers, in-vehicle control networks, Internet-of-Things (IoT) devices, traffic control devices, integrated access and backhaul (IAB) nodes, user equipment (UEs), base stations, relay stations, switches, routers, customer premises equipment (CPEs), and/or vehicles (e.g., land-based vehicles, aerial vehicles, non-terrestrial vehicles, and/or water-based vehicles).

As indicated above, in some aspects, clients and/or servers may be, include, be included within, and/or be implemented on one or more wireless network devices. For example, in some aspects, a client may be, include, be included in, and/or be implemented on a UE and a server may be, include, be included in, and/or be implemented on a base station. In some aspects, a client may include a server that is configured to operate as a client. In some aspects, a server may include a client configured to operate as a server. In some aspects, one or more servers and/or one or more clients may communicate using any number of types of communication connections such as, for example, wired networks, wireless networks, multi-hop networks, and/or combinations of wired networks, wireless networks, and/or multi-hop networks.

Figure 2:
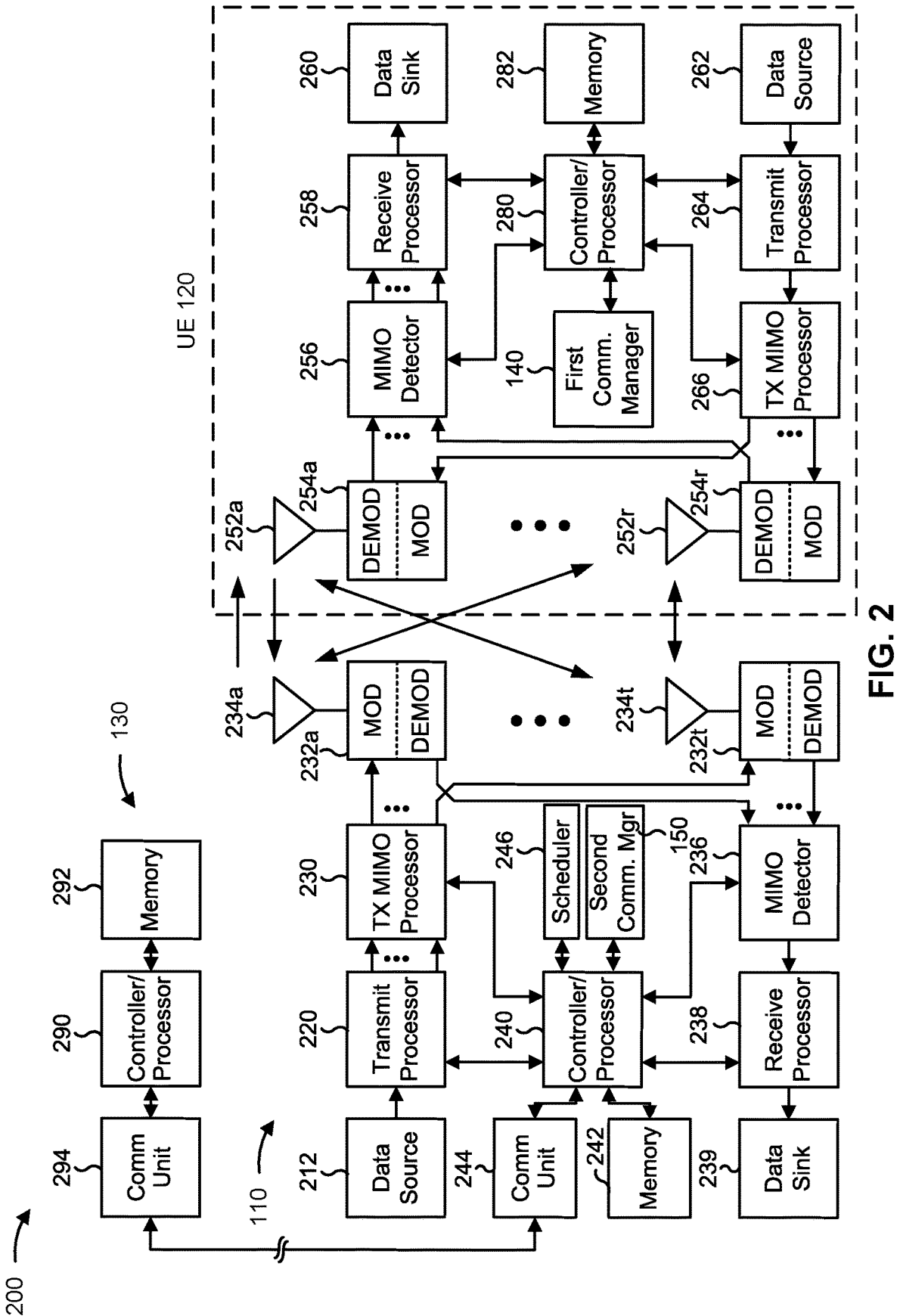
FIG. 2 is a diagram illustrating an example of a base station in communication with a user equipment (UE) in a wireless network, in accordance with the present disclosure.

FIGS. 1 and 2, and the accompanying text below, provide examples of aspects of wireless networks and wireless network devices that may be used to implement one or more aspects of subject matter disclosed herein. FIGS. 3-7, and the accompanying text, describe aspects of operations that may be performed by clients and/or servers, which may include, for example, UEs and base stations as shown in, and described in connection with, FIGS. 1 and 2, and/or other implementations of clients and/or servers such as, for example, those described above. FIGS. 8-13, and the accompanying text, describe examples of apparatuses for implementing clients and/or servers, in accordance with various aspects of the present disclosure. The apparatuses may include wireless network devices and/or any number of other computing devices, as indicated above in connection with clients and/or servers.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 4:
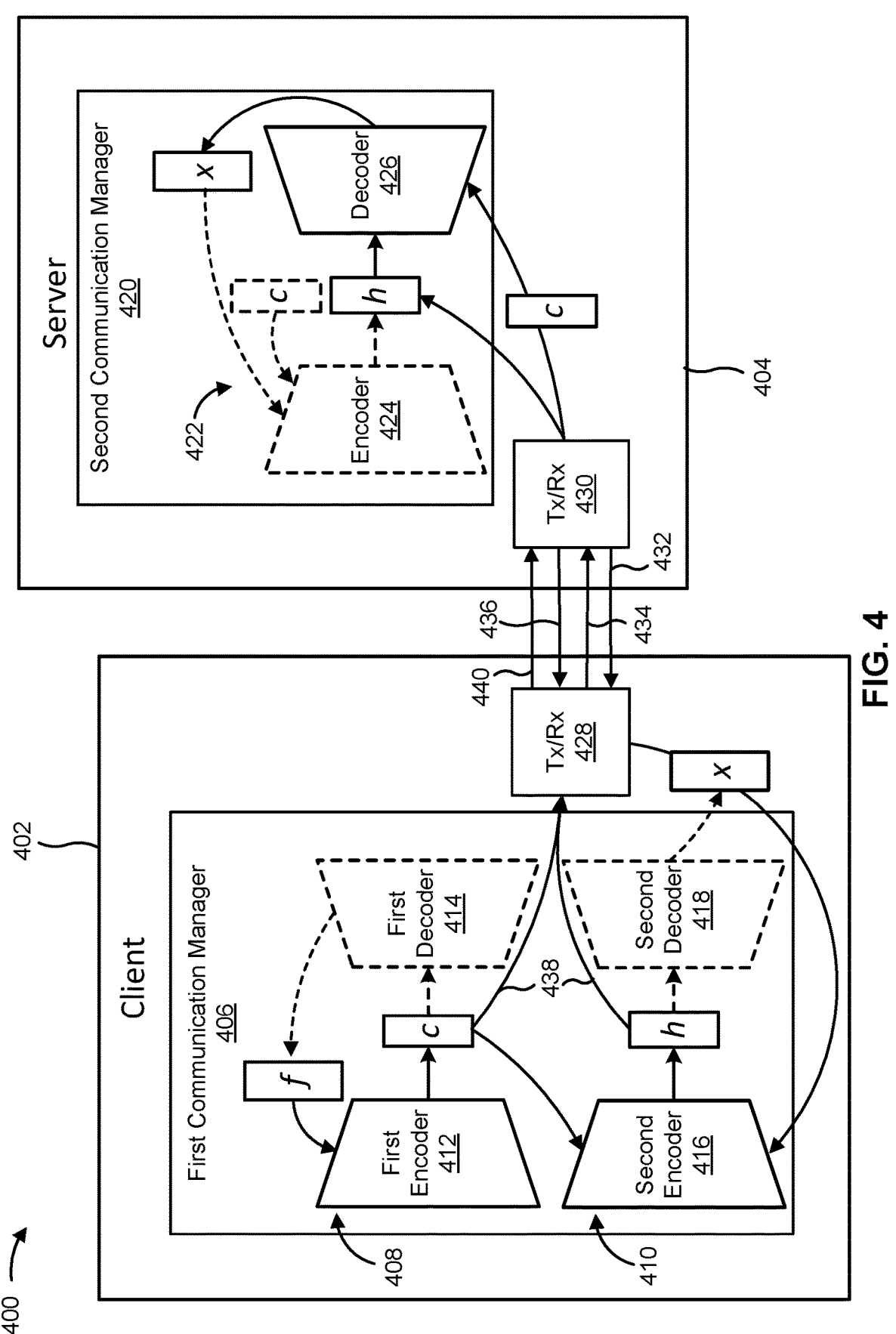
FIG. 4 is a diagram illustrating an example of customization feature vector feedback for machine learning components in wireless communication, in accordance with the present disclosure.

FIG. 1 is a diagram illustrating an example of a wireless network 100, in accordance with the present disclosure. As indicated above, one or more aspects of the wireless network 100 may be used to implement aspects of one or more clients and servers as shown in FIG. 4, and described below in connection therewith. The wireless network 100 may be or may include elements of a 5G (NR) network and/or an LIE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used. In some aspects, a base station 110 may be, include, be included in, and/or be used to implement a server such as the server 404 shown in FIG. 4 and described below. A UE may be, include, be included in, and/or be used to implement a client such as the client 402 shown in FIG. 4 and described below. In some aspects, a base station 110 may be may be, include, be included in, and/or be used to implement a client. In some aspects, a UE 120 may be, include, be included in, and/or be used to implement a server.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, Pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links Anchor base station(s) and/or non-anchor base station(s) may communicate with one or more UEs (e.g., UE 120) via access links, which may be wireless links for carrying access traffic. The BSs may also communicate with one another, directly or indirectly, via a wireless or wireline backhaul.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a non-terrestrial wireless communication device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may receive a customization feature vector feedback configuration associated with a reporting procedure for reporting updates corresponding to at least one customization feature vector that is based at least in part on one or more features associated with an environment of the client; determine an update corresponding to the at least one customization feature vector using a machine learning component; and transmit the update based at least in part on the customization feature vector feedback configuration. Additionally, or alternatively, the first communication manager 140 may perform one or more other operations described herein.

In some aspects, the base station 110 may include a second communication manager 150. As described in more detail elsewhere herein, the second communication manager 150 may transmit a customization feature vector feedback configuration associated with a reporting procedure for reporting updates corresponding to at least one customization feature vector that is based at least in part on a machine learning component and one or more features associated with an environment of a client; and receive an update corresponding to the at least one customization feature vector based at least in part on the configuration. Additionally, or alternatively, the second communication manager 150 may perform one or more other operations described herein.

As indicated above, FIG. 1 is provided as an example. Other examples may differ from what is described with regard to FIG. 1.

FIG. 2 is a diagram illustrating an example 200 of a base station 110 in communication with a UE 120 in a wireless network 100, in accordance with the present disclosure. Base station 110 may be equipped with T antennas 234a through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-7).

Controller/processor 240 of base station 110, controller/processor 280 of UE 120, and/or any other component(s) of FIG. 2 may perform one or more techniques associated with customization feature vector feedback for machine learning components in wireless communication, as described in more detail elsewhere herein. For example, controller/processor 240 of base station 110, controller/processor 280 of UE 120, and/or any other component(s) of FIG. 2 may perform or direct operations of, for example, process 600 or FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 or FIG. 6, process 700 of FIG. 7, and/or other processes as described herein. In some aspects, executing instructions may include running the instructions, converting the instructions, compiling the instructions, and/or interpreting the instructions, among other examples.

In some aspects, a client (e.g., the UE 120) may include means for receiving a customization feature vector feedback configuration associated with a reporting procedure for reporting updates corresponding to at least one customization feature vector that is based at least in part on one or more features associated with an environment of the client; means for determining an update corresponding to the at least one customization feature vector using a machine learning component; and means for transmitting the update based at least in part on the customization feature vector feedback configuration. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a server (e.g., the base station 110) may include means for transmitting a customization feature vector feedback configuration associated with a reporting procedure for reporting updates corresponding to at least one customization feature vector that is based at least in part on a machine learning component and one or more features associated with an environment of a client; and means for receiving an update corresponding to the at least one customization feature vector based at least in part on the configuration. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
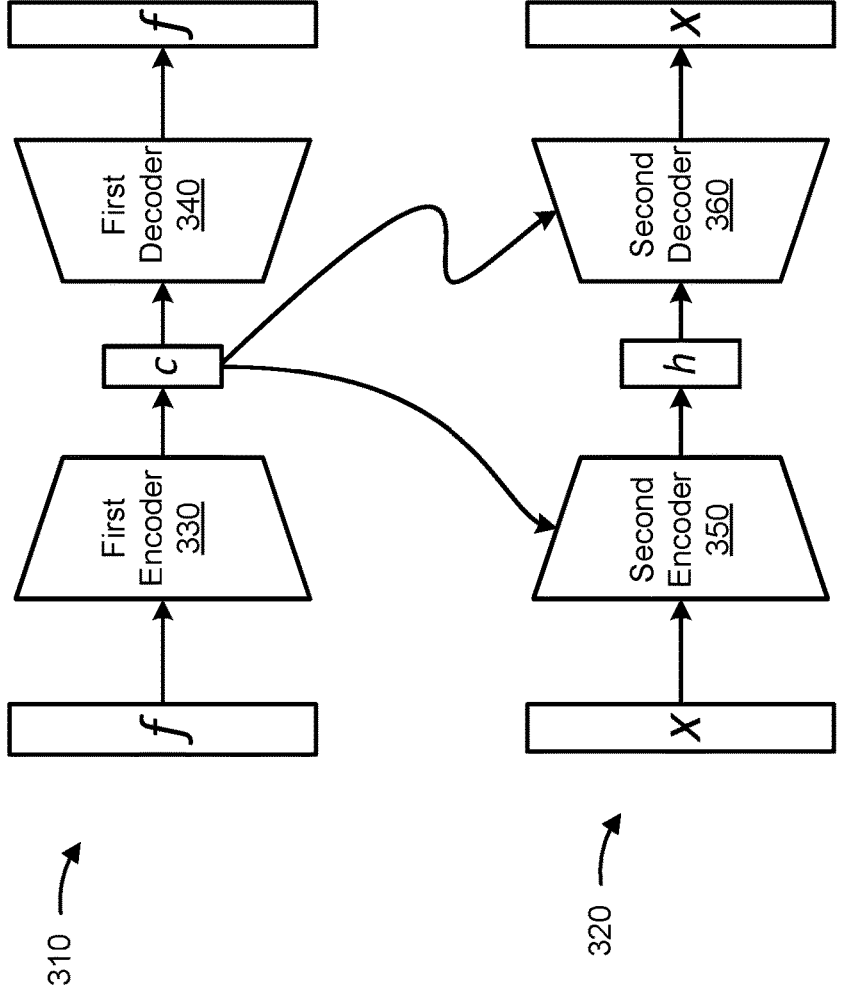
FIG. 3 is a diagram illustrating an example of an auto-encoder pair, in accordance with the present disclosure.

FIG. 3 is a diagram illustrating an example 300 of an autoencoder pair, in accordance with the present disclosure. Aspects of the example 300 may be implemented by a client (e.g., the client 402 shown in FIG. 4), a server (e.g., the server 404 shown in FIG. 4), and/or the like. As described above, a client may be, include, be included in, and/or be implemented using a computing device configured to such as a network device, a UE (such as the UE 120 shown in FIGS. 1 and 2) An autoencoder associated with a client may be referred to as a client autoencoder. An autoencoder associated with a server may be referred to as a server autoencoder.

As shown, the autoencoder pair includes a first autoencoder 310 and a second autoencoder 320. The first autoencoder 310 and/or the second autoencoder 320 may be a regular autoencoder or a variational autoencoder. The first autoencoder 310 may include a first encoder 330 configured to receive an observed environmental vector, f, as input and to provide a feature vector, y, as output. The first autoencoder 310 also may include a first decoder 340 configured to receive the feature vector y as input and to provide (e.g., recover) the observed environmental vector f as output.

In some aspects, the observed environmental vector f may include one or more variables that may be observed to facilitate learning the environment of a client, s. In some aspects, the feature vector y may include learned "labels" or features that may summarize, aggregate, and/or otherwise characterize the information in the observed environmental vector f.

In some aspects, a latent vector, h, may be associated with a wireless communication task. In some aspects, the wireless communication task may include determining CSF, determining positioning information associated with the client, determining a modulation associated with a wireless communication, determining a waveform associated with a wireless communication, and/or the like.

For example, in some aspects, paired autoencoders may be used for compressing CSF for feeding back CSI to a server. In some aspects, an observed wireless communication vector, x, may comprise a propagation channel that the client (e.g., a UE 120) estimates based at least in part on a received CSI-RS. The latent vector h may comprise compressed CSF to be fed back to a server (e.g., a base station 110).

In some aspects, the observed environmental vector, f, may include any number of different types of information that a client may obtain about an environment of the client. Information about the environment of the client may include information about the client (e.g., device information, configuration information, capability information, and/or the like), information about a state associated with the client (e.g., an operation state, a power state, an activation state, and/or the like), information about the location of the client (e.g., positioning information, orientation information, geographical information, motion information, and/or the like), information about an environment surrounding the client (e.g., weather information, information about obstacles to wireless signals surrounding the client, information about materials in the vicinity of the client, and/or the like), and/or the like. The observed environmental vector, f may be formed by concatenating one or more information indications such as those listed above.

In some aspects, for example, the observed environmental vector, f, may include a client identifier (ID), a client antenna configuration, a large-scale channel characteristic, a CSI-RS configuration, an image obtained by an imaging device, a portion of an estimated propagation channel, and/or the like. In some aspects, for example, the large scale channel characteristic may indicate a delay spread associated with a channel, a power delay profile associated with a channel, a Doppler measurement associated with a channel, a Doppler spectrum associated with a channel, a signal to noise ratio (SNR) associated with a channel, a signal to noise plus interference ratio (SiNR) associated with a channel, a reference signal received power (RSRP), a received signal strength indicator (RSSI), and/or the like.

As shown, the second autoencoder 320 may include a second encoder 350 configured to receive an observed wireless communication vector, x, and the feature vector, y, as input and to provide a latent vector, h, as output. The second autoencoder 320 also may include a second decoder 360 configured to receive the latent vector, h, and the feature vector, y, as input and to provide (e.g., recover) the observed wireless communication vector, x, as output.

According to various aspects, autoencoder pairs such as the autoencoder 310 and the autoencoder 320 may be trained before being used for inference. In some aspects, for example, the autoencoder pairs may be trained based on using a reparameterization. For example, during training, the first encoder 330 may be used to sample or compute the feature vector y using the reparameterization trick, which may be used to train both the first autoencoder 310 and the second autoencoder 320.

In some aspects, the feature vector, y, from the first encoder 330 may condition the second autoencoder 320 to perform well in the observed environment. This can be viewed as an expert selection. The format of the feature vector, y, may be learned by training both the first and second autoencoders 310 and 320 together. In this way, human input may not be needed for development of the feature vector, y. In some aspects, the first autoencoder 310 and/or the second autoencoder 320 may be trained using an unsupervised learning procedure. The first autoencoder 310 and/or the second autoencoder 320 may be trained using a federated learning procedure.

In some cases, the first machine learning component may be learned and/or updated less frequently than the second machine learning component. For example, the first machine learning component may be configured to determine a customization feature vector based at least in part on an observed environmental vector associated with the client. The observed environmental vector may include elements that do not change or that change infrequently (e.g., client identifiers, positioning information associated with an unmoving client, antenna identifiers, and other infrequency changing environmental information). As a result, the customization feature vector may change infrequently and feeding the customization feature vector back to the server each time a latent vector is provided to the server may result in unnecessary consumption of communication resources.

Aspects of the techniques and apparatuses described herein may facilitate customization feature vector feedback for machine learning components in wireless communication. In some aspects, a client may receive a customization feature vector feedback configuration associated with a reporting procedure for reporting updates corresponding to at least one customization feature vector.

The client may determine an update corresponding to the at least one customization feature vector using a machine learning component and may transmit the update based at least in part on the customization feature vector feedback configuration. The customization feature vector feedback configuration may configure the client to provide updates in a manner that reduces consumption of communication resources. In this way, aspects described herein may facilitate use of machine learning components without increasing resource consumption unnecessarily. Aspects of the techniques described herein may be used for any number of cross-node machine learning challenges including, for example, facilitating channel state feedback, facilitating positioning of a client, and/or learning of modulation and/or waveforms for wireless communication.

As indicated above, FIG. 3 is provided merely as an example. Other examples may differ from what is described with regard to FIG. 3.

FIG. 4 is a diagram illustrating an example 400 of customization feature vector feedback for machine learning components in wireless communication, in accordance with the present disclosure. As shown, a client 402 and a server 404 may communication with one another. The client 402 and the server 404 may communicate with one another via a wireless network (e.g., the wireless network 100 shown in FIG. 1). In some cases, more than one client 402 and/or more than one server 404 may communicate with one another.

The client 402 and/or the server 404 may be, be similar to, include, be included in, and/or be implemented using a computing device. The computing device may include, for example, a wireless communication device a network device (e.g., a wireless network device and/or wired network device), a portable computer, a laptop, a tablet, a workstation, a personal computer, a controller, an in-vehicle control network, an IoT device, a traffic control device, an IAB node, a UE, a base station, a relay station, a switch, a router, a CPE, a vehicle (e.g., land-based vehicles, aerial vehicles, non-terrestrial vehicles, and/or water-based vehicles), and/or any combination and/or For example, the client 402 may be a UE (e.g., UE 120 shown in FIG. 1) and the server 404 may be a base station (e.g., base station 110 shown in FIG. 1), and the client 402 and the server 404 may communicate via an access link. The client 402 and the server 404 may be UEs 120 that communicate via a sidelink.

As shown, the client 402 may include a first communication manager 406 (e.g., the first communication manager 140 shown in FIG. 1) that may be configured to utilize a first machine learning component (shown, for example, as a first client autoencoder) 408 and a second machine learning component (shown, for example, as a second client autoencoder) 410 to perform one or more wireless communication tasks. The first client autoencoder 408 may be, be similar to, include, or be included in, the first autoencoder 310 shown in FIG. 3 and described above. The second client autoencoder 410 may be, be similar to, include, or be included in, the second autoencoder 320 shown in FIG. 3 and described above. The first communication manager 406 may be configured to utilize any number of additional machine learning components not shown in FIG. 4. The additional machine learning components may be, be similar to, include, or be included in the first autoencoder 310 shown in FIG. 3 and/or the second autoencoder 320 shown in FIG. 3.

As shown, the first client autoencoder 408 may include a first encoder 412 configured to receive an observed environmental vector, f, as input and to provide a customization feature vector, c, as output. The first client autoencoder 408 also includes a first decoder 414 configured to receive the customization feature vector c as input and to provide the observed environmental vector f as output.

As shown, the second client autoencoder 410 may include a second encoder 416 configured to receive an observed wireless communication vector, x, and the customization feature vector c as input and to provide a latent vector, h, as output. The second client autoencoder 410 also may include a second decoder 418 configured to receive the latent vector, h, and the customization feature vector c as input and to provide the observed wireless communication vector x as output.

As shown in FIG. 4, the server 404 may include a second communication manager 420 (e.g., the second communication manager 150) that may be configured to utilize a server machine learning component (shown, for example, as a server autoencoder) 422 to perform one or more wireless communication tasks. For example, in some aspects, the server autoencoder 422 may correspond to the second client autoencoder 410. The server autoencoder 422 may be, be similar to, include, or be included in, the second autoencoder 320 shown in FIG. 3 and described below. The second communication manager 420 may be configured to utilize any number of additional machine learning components not shown in FIG. 4. The additional machine learning components may be, be similar to, include, or be included in the first autoencoder 310 shown in FIG. 5 and/or the second autoencoder 320 shown in FIG. 3.

The server autoencoder 422 may include an encoder 424 configured to receive the observed wireless communication vector x and the customization feature vector c as input and to provide a latent vector h as output. The server autoencoder 422 also may include a decoder 426 configured to receive the latent vector h and the customization feature vector y as input and to provide the observed wireless communication vector x as output.

As shown in FIG. 4, the client 402 may include a transceiver (shown as "Tx/Rx") 428 that may facilitate wireless communications with a transceiver 430 of the server 404. As shown by reference number 432, for example, the server 404 may transmit a customization feature vector feedback configuration to the client 402. The customization feature vector feedback configuration may be associated with a reporting procedure for reporting updates corresponding to at least one customization feature vector (e.g., the customization feature vector c) that is based at least in part on one or more features associated with an environment of the client.

In some aspects, the client 402 may determine an update corresponding to the at least one customization feature vector using a machine learning component. As indicated by the dashed lines associated with the first autoencoder 408, for example, the first decoder 414 may be used, along with training data, to determine the update. As shown by reference number 434, the client 402 may transmit, and the server 404 may receive, the update. The client 402 may transmit the update based at least in part on the customization feature vector feedback configuration.

As shown by reference number 436, the server 404 may transmit, using the transceiver 430, a wireless communication to the client 402. The wireless communication may include, for example, a reference signal such as a channel state information reference signal (CSI-RS). The transceiver 428 of the client 402 may receive the wireless communication. The communication manager 406 may determine an observed wireless communication vector x based at least in part on the wireless communication. For example, in aspects in which the wireless communication is a CSI-RS, the observed wireless communication vector x may include channel state information (CSI).

As shown, the communication manager 406 may obtain an observed environmental vector, f, and provide the observed environmental vector f to the first encoder 412 of the first client autoencoder 408. The communication manager 406 may obtain the observed environmental vector from memory, from one or more sensors, and/or the like. As shown, the first encoder 412 may determine, based at least in part on the observed environmental vector f a customization feature vector c. As shown, the communication manager 406 may provide, as input, the customization feature vector c, and the observed wireless communication vector x, to the second encoder 416 of the second client autoencoder 410. The second encoder 416 of the second client autoencoder 410 may determine, based at least in part on the customization feature vector c and the observed wireless communication vector x, a latent vector h.

As shown by reference number 438, the communication manager 406 may provide the customization feature vector c and the latent vector h to the transceiver 428 for transmission. As shown by reference number 440, the transceiver 428 may transmit, and the transceiver 430 of the server 404 may receive, the customization feature vector c and the latent vector h. As shown, the communication manager 420 of the server 404 may provide the customization feature vector c and the latent vector h as input to the decoder 426 of the server autoencoder 422. The decoder 426 may determine (e.g., reconstruct) the observed wireless communication vector x based at least in part on the customization feature vector c and the latent vector h. In some aspects, the server 404 may perform a wireless communication action based at least in part on the observed wireless communication vector x. For example, in aspects in which the observed wireless communication vector x comprises CSI, the communication manager 420 of the server 404 may use the CSI for communication grouping, beamforming, and/or the like.

In some aspects, a client 402 and/or a server 404 may perform one or more additional operations. A client 402 and/or a server 404 may be configured, for example, to use one or more different types of machine learning components, to use one or more procedures and/or components in addition to, or in lieu of one or more machine learning components. For example, in some aspects, a client 402 and/or a server 404 may be configured to perform a first type of procedure in connection with a received signal and to perform a second type of procedure in connection with the received signal and/or another received signal. The first type of procedure may be performed using a first algorithm, a first processing block, and/or a first machine learning component, and the second type of procedure may be performed using a second algorithm, a second processing block, and/or a second machine learning component. In an example, a client 402 may determine a first CSI associated with a received signal using a first procedure and may determine a second CSI associated with the received signal and/or a different received signal using a second procedure.

As indicated above, FIG. 4 is provided merely as an example. Other examples may differ from what is described with regard to FIG. 4.

Figure 5:
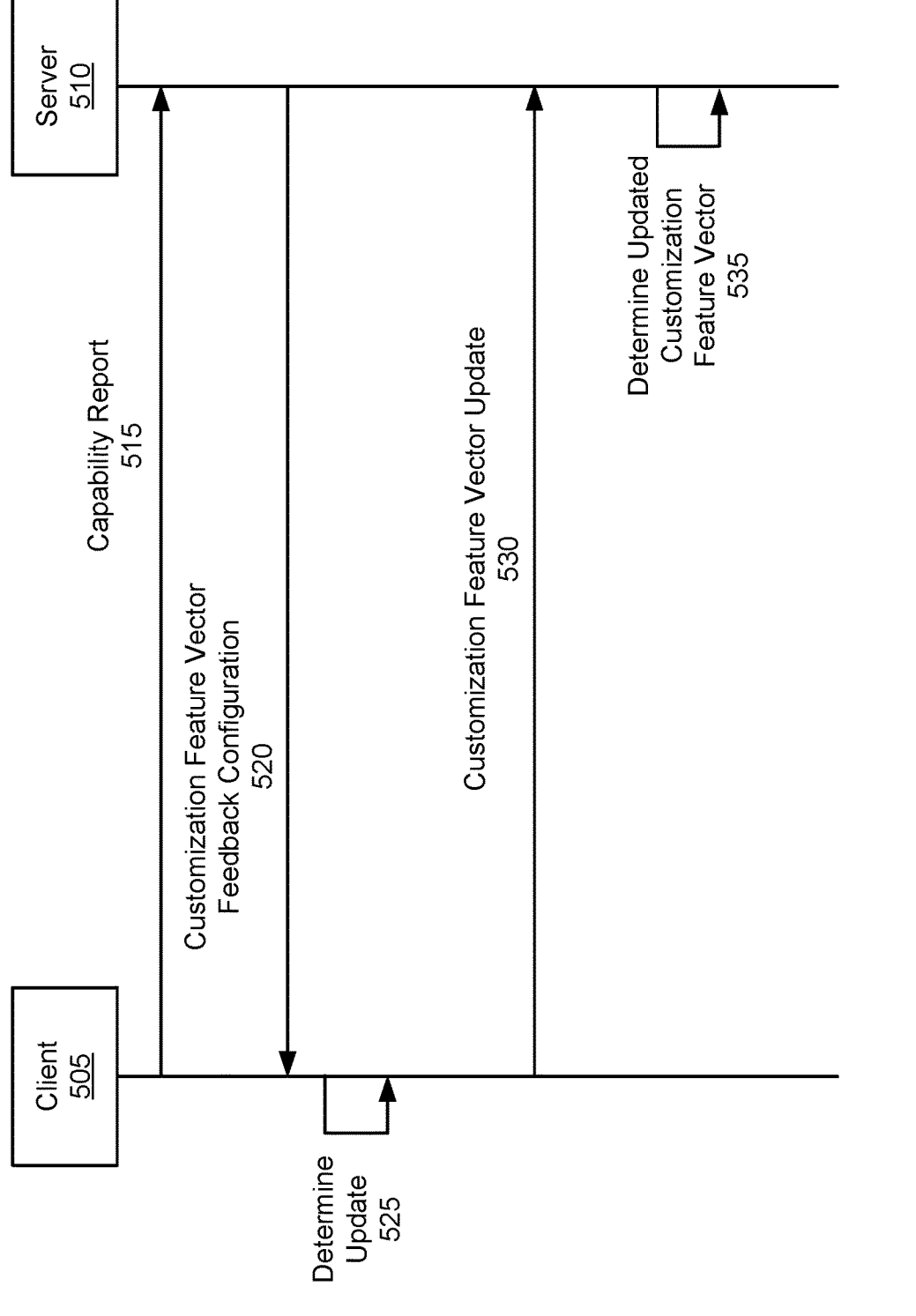
FIG. 5 is a diagram illustrating an example of customization feature vector feedback for machine learning components in wireless communication, in accordance with the present disclosure.

FIG. 5 is a diagram illustrating an example of customization feature vector feedback for machine learning components in wireless communication, in accordance with the present disclosure. As shown, a client 505 and a server 510 may communicate with one another. In some aspects, the client 505 may be, be similar to, include, or be included in the client 402 shown in FIG. 4. In some aspects, the server 510 may be, be similar to, include, or be included in the server 404 shown in FIG. 4.

As shown by reference number 515, the client 505 may transmit, and the server 510 may receive, a capability report. The capability report may indicate a one or more capabilities of the client 505. For example, the capability report may indicate a number of customization feature vectors that the client 505 can support. The number of customization feature vectors that the client 505 can support may include the number of customization feature vectors that the client 505 is capable of processing, updating, and/or tracking simultaneously.

For example, the client 505 may support at least one customization feature vector. The at least one customization feature vector may include a plurality of customization feature vectors. The plurality of customization feature vectors may correspond to a plurality of communication parameters. In some aspects, for example, a first customization feature vector of the plurality of customization feature vectors may corresponds to a first communication parameter of the plurality of communication parameters, and a second customization feature vector of the plurality of customization feature vectors may correspond to a second communication parameter of the plurality of communication parameters. The plurality of communication parameters may indicate at least one of a component carrier, a bandwidth part, a band, a band combination, a frequency range, a use case, a neural network identifier, or a combination thereof. The use case may include at least one of a CSI derivation, a positioning measurement derivation, demodulation of a data channel, or a combination thereof.

As shown by reference number 520, the server 510 may transmit, and the client 505 may receive, a customization feature vector feedback configuration. The customization feature vector feedback configuration may be associated with a reporting procedure for reporting updates corresponding to at least one customization feature vector. The customization feature vector may be based at least in part on one or more features associated with an environment of the client 505. In some aspects, the customization feature vector feedback configuration may be based at least in part on the customization report.

As shown by reference number 525, the client 505 may determining an update corresponding to the at least one customization feature vector using a machine learning component. The machine learning component may include at least one neural network (e.g., at least one autoencoder). The client 505 may determine the update by determining a set of values corresponding to the at least one customization feature vector. The update may include a locally updated customization feature vector. A locally updated customization feature vector is a customization feature vector that is updated by the client. The update may include a subset of elements of a locally updated customization feature vector that are different than a corresponding subset of elements of a previously transmitted update.

As shown by reference number 530, the client 505 may transmit, and the server 510 may receive, the update corresponding to the customization feature vector (shown as customization feature vector update). As shown by reference number 535, the server may determine an updated customization feature vector based at least in part on the update.

In some aspects, the client 505 may transmit the update using a set of allocated uplink resources. In some aspects, the server 510 may indicate that a portion of the set of allocated uplink resources may be used to carry the update. For example, in some aspects, the customization feature vector configuration may indicate a transmission parameter that indicates a quantity of scheduled uplink resources that can be used to carry one or more portions of the update. The quantity of the scheduled uplink resources may include a percentage of a set of allocated uplink resources. The set of allocated uplink resources may correspond to at least one of a physical uplink control channel (PUCCH), a physical uplink shared channel (PUSCH), or a combination thereof.

In some aspects, the client 505 may transmit the update using at least one of an uplink medium access control (MAC) control element (MAC CE), a radio resource control (RRC) message, an uplink control information (UCI) transmission, or a combination thereof.

In some aspects, the resources that can be used to transmit the update may not be sufficient to carry the entire update. For example, the client 505 may determine a size of the update, determine a payload size capable of being carried by the quantity of scheduled uplink resources and determine that the size of the update is larger than the payload size. The client 505 may drop a portion of the update based at least in part on determining that the size of the update is larger than the payload size. In some aspects, the client 505 may determine a decreased quantization level that is lower than an initial quantization level based at least in part on determining that the size of the update is larger than the payload size. In some aspects, the client 505 may transmit a first portion of the update in a first packet and transmit a second portion of the update in a second packet.

In some aspects, the client 505 may transmit the update by quantizing the locally updated customization feature vector to generate a quantized update and transmitting the quantized update. The locally updated customization feature vector may include a plurality of elements, and wherein the client 505 may quantize the locally updated customization feature vector comprises quantizing each of the plurality of elements. The client 505 may determine an indication of a bit size corresponding to the quantized update. The quantized update may include a fixed bit number and the fixed bit number may include the bit size. The indication of the bit size may be carried in at least one of the customization feature vector configuration, an RRC message, a downlink control information (DCI) transmission, a MAC CE, or a combination thereof.

In some aspects, the client 505 may transmit a quantization capability indication that indicates a maximum bit size for quantization of customization feature vector updates. The maximum bit size may be based at least in part on the quantization capability indication. The client 505 may receive a resource allocation for transmitting the update. The maximum bit size may be based at least in part on the resource allocation. The indication of the bit size may be carried in at least one of the customization feature vector configuration, an RRC message, a DCI transmission, a MAC CE, or a combination thereof.

In some aspects, the quantized update may include a non-uniform quantization of one or more elements of the locally updated customization feature vector. The client 505 may receive an indication of a non-uniform quantization scheme (e.g., via the customization feature vector configuration, an RRC message, a DCI transmission, and/or a MAC CE). The non-uniform quantization may be based at least in part on the indication of the non-uniform quantization scheme. In some aspects, the client 505 may transmit, and the server 510 may receive, a non-uniform quantization capability indication. The non-uniform quantization scheme may be based at least in part on the non-uniform quantization capability. In some aspects, the client 505 may transmit, and the server 510 may receive, a non-uniform quantization suggestion. The client 505 may suggest a non-uniform quantization scheme, or one or more aspects thereof, based at least in part on a client capability, availability of resources, and/or channel information. The non-uniform quantization scheme may be based at least in part on the non-uniform quantization suggestion.

In some aspects, the client 505 may be configured to provide periodic feedback of a latent vector. In some aspects, feedback of the update corresponding to the customization feature vector may be configured in relation to the periodic feedback corresponding to the latent vector. For example, in some aspects, the client 505 may receive (e.g., from the server 510) a latent vector configuration that indicates a periodic reporting procedure for reporting updates corresponding to at least one latent vector. The latent vector configuration may be carried in at least one of an RRC message, a MAC CE, or a combination thereof.

The client 505 may determine an update corresponding to the at least one latent vector. The client 505 may determine the update corresponding to the at least one latent vector using a machine learning component. The client 505 may transmit, and the server 510 may receive, the update corresponding to the at least one latent vector based at least in part on the latent vector configuration. The at least one customization feature vector may include a plurality of customization feature vectors, and the customization feature vector configuration may indicate an ordering associated with transmitting a plurality of updates corresponding to the plurality of customization feature vectors.

The latent vector configuration may indicate a first periodicity associated with reporting updates corresponding to the at least one latent vector. The first periodicity may include an amount of time between consecutive transmissions of the updates corresponding to the at least one latent vector. The customization feature vector configuration may indicate a second periodicity associated with reporting the updates corresponding to the at least one customization feature vector. The second periodicity may include an amount of time between consecutive transmissions of the updates corresponding to the at least one customization feature vector. The first periodicity may be smaller than the second periodicity.

In some aspects, the second periodicity may be defined using a scaling factor based at least in part on the first periodicity. For example, the latent vector configuration may indicate a first periodicity associated with reporting updates corresponding to the at least one latent vector and a scaling factor for determining a second periodicity relative to the first periodicity. The second periodicity may include an amount of time between consecutive transmissions of the updates corresponding to the at least one customization feature vector. In some aspects, the client 505 may determine the second periodicity based at least in part on the first periodicity and the scaling factor. The client 505 may transmit, and the server 510 may receive, an indication of the second periodicity.

The scaling factor may include an explicit scaling factor. That is, for example, the customization feature vector configuration may include a scaling factor table that maps the first periodicity to one or more second periodicity options. The client 505 may select the second periodicity from the one or more second periodicity options. For example, in the CSI-Reporting scenario, the configuration may include a single periodicity for reporting the latent vector h, and an explicit or implicit scaling factor to determine the reduced periodicity of the reporting of the c. An explicit scaling factor may corresponds to a factor, $\alpha=\{0.1, 0.2, 0.5, 0.75\}$ in the configuration. A table maps each periodicity, T, of the latent vector h to a different periodicity of c. For example, if $T_h=100$ milliseconds, then $T_c=\{200,400,500\}$", then the client 505 can pick the value and report it in the c-report. In some aspects, the scaling factor may include an implicit scaling factor, in which the first periodicity maps to the second periodicity.

The client 505 may identify a collision between a scheduled transmission of the plurality of updates corresponding to the plurality of customization feature vectors and an additional transmission. The client 505 may refrain from transmitting an end portion of a report comprising the plurality of updates corresponding to the plurality of customization feature vectors based at least in part on identifying the collision.

In some aspects, the client 505 may receive a resource allocation associated with a scheduled transmission of the plurality of updates corresponding to the plurality of customization feature vectors and an additional transmission. The client 505 may determine that the resource allocation is insufficient to transmit a report comprising the plurality of updates corresponding to the plurality of customization feature vectors. The client 505 may refraining from transmitting an end portion of the report based at least in part on determining that the resource allocation is insufficient to transmit the report.

In some aspects, the at least one customization feature vector may include a plurality of customization feature vectors. The at least one latent vector may include a plurality of latent vectors, and the client 505 may transmit, according to an ordering, a first plurality of updates. The first plurality of updates may correspond to the plurality of customization feature vectors and the client 505 may transmit, according to the ordering, a second plurality of updates that correspond to the plurality of latent vectors.

In some aspects, transmitting the first plurality of updates and the second plurality of updates according to the ordering may include transmitting the first plurality of updates prior to transmitting the second plurality of updates. In some aspects, transmitting the first plurality of updates and the second plurality of updates according to the ordering may include transmitting a first update of the first plurality of updates; transmitting, after the first update, a second update of the second plurality of updates; transmitting, after the second update, a third update of the first plurality of updates; and transmitting, after the third update, a fourth update of the second plurality of updates.

In some aspects, the customization feature vector configuration may include an indication to transmit the update corresponding to the at least one customization feature vector based at least in part on receiving a latent vector feedback request. The latent vector feedback request may be carried in at least one of a DCI transmission, a MAC CE, or a combination thereof. In some aspects, the latent vector feedback request may include a trigger that triggers transmission of an update corresponding to the at least one latent vector, and the trigger further may trigger transmission of the update corresponding to the at least one customization feature vector.

In some aspects, the client 505 may transmit, to the server 510, a feedback resource request, wherein the feedback resource request comprises a request for a first set of resources for transmitting the update corresponding to the at least one latent vector. The feedback resource request may include a request for a second set of resources for transmitting the update corresponding to the at least one customization feature vector.

In some aspects, the client 505 may determine an occurrence of an update reporting trigger event and may transmit, based at last on determining the occurrence of the update reporting trigger event, at least one of the update corresponding to the at least one customization feature vector or the update corresponding to the at least one latent vector. In some aspects, the client 505 may determine the update corresponding to the at least one latent vector by determining a locally updated latent vector based at least in part on a previously reported customization feature vector. The client 505 may determine the update corresponding to the at least one latent vector by determining a locally updated latent vector based at least in part on a default customization feature vector. The default customization vector may include an initial customization vector that was determined at an initialization phase and/or a setup phase.

As indicated above, FIG. 5 is provided merely as an example. Other examples may differ from what is described with regard to FIG. 5.

FIG. 6 is a diagram illustrating an example process 600 performed, for example, by a client, in accordance with the present disclosure. Example process 600 is an example where the client (e.g., client 505 shown in FIG. 5 and/or client 402 shown in FIG. 4) performs operations associated with customization feature vector feedback for machine learning components in wireless communication.

As shown in FIG. 6, in some aspects, process 600 may include receiving a customization feature vector feedback configuration associated with a reporting procedure for reporting updates corresponding to at least one customization feature vector that is based at least in part on one or more features associated with an environment of the client (block 610). For example, the client (e.g., using reception component 802, depicted in FIG. 8) may receive a customization feature vector feedback configuration associated with a reporting procedure for reporting updates corresponding to at least one customization feature vector that is based at least in part on one or more features associated with an environment of the client, as described above.

As further shown in FIG. 6, in some aspects, process 600 may include determining an update corresponding to the at least one customization feature vector using a machine learning component (block 620). For example, the client (e.g., using communication manager 804, depicted in FIG. 8) may determine an update corresponding to the at least one customization feature vector using a machine learning component, as described above.

As further shown in FIG. 6, in some aspects, process 600 may include transmitting the update based at least in part on the customization feature vector feedback configuration (block 630). For example, the client (e.g., using transmission component 806, depicted in FIG. 8) may transmit the update based at least in part on the customization feature vector feedback configuration, as described above.

Process 600 may include additional aspects, such as any single aspect or any combination of aspects described below and/or in connection with one or more other processes described elsewhere herein.

In a first aspect, the machine learning component comprises at least one neural network.

In a second aspect, alone or in combination with the first aspect, the at least one neural network comprises at least one autoencoder.

In a third aspect, alone or in combination with one or more of the first and second aspects, determining the update comprises determining a set of values corresponding to the at least one customization feature vector.

In a fourth aspect, alone or in combination with one or more of the first through third aspects, the update comprises a locally updated customization feature vector.

In a fifth aspect, alone or in combination with one or more of the first through fourth aspects, the update comprises a subset of elements of a locally updated customization feature vector that are different than a corresponding subset of elements of a previously transmitted update.

In a sixth aspect, alone or in combination with one or more of the first through fifth aspects, the at least one customization feature vector comprises a plurality of customization feature vectors.

In a seventh aspect, alone or in combination with one or more of the first through sixth aspects, the plurality of customization feature vectors corresponds to a plurality of communication parameters.

In an eighth aspect, alone or in combination with one or more of the first through seventh aspects, the plurality of communication parameters indicate at least one of a component carrier, a bandwidth part, a band, a band combination, a frequency range, a use case, a neural network identifier, or a combination thereof.

In a ninth aspect, alone or in combination with one or more of the first through eighth aspects, the use case comprises at least one of a channel state information derivation, a positioning measurement derivation, demodulation of a data channel, or a combination thereof.

In a tenth aspect, alone or in combination with one or more of the first through ninth aspects, a first customization feature vector of the plurality of customization feature vectors corresponds to a first communication parameter of the plurality of communication parameters, and wherein a second customization feature vector of the plurality of customization feature vectors corresponds to a second communication parameter of the plurality of communication parameters.

In an eleventh aspect, alone or in combination with one or more of the first through tenth aspects, process 600 includes transmitting a capability report that indicates a number of customization feature vectors that the client can support, wherein the customization feature vector configuration is based at least in part on the capability report.

In a twelfth aspect, alone or in combination with one or more of the first through eleventh aspects, the customization feature vector configuration indicates a transmission parameter that indicates a quantity of scheduled uplink resources that can be used to carry one or more portions of the update.

In a thirteenth aspect, alone or in combination with one or more of the first through twelfth aspects, the quantity of the scheduled uplink resources comprises a percentage of a set of allocated uplink resources.

In a fourteenth aspect, alone or in combination with one or more of the first through thirteenth aspects, the set of allocated uplink resources correspond to at least one of a physical uplink control channel, a physical uplink shared channel, or a combination thereof.

In a fifteenth aspect, alone or in combination with one or more of the first through fourteenth aspects, process 600 includes determining a size of the update, determining a payload size capable of being carried by the quantity of scheduled uplink resources, determining that the size of the update is larger than the payload size, and dropping a portion of the update based at least in part on determining that the size of the update is larger than the payload size.

In a sixteenth aspect, alone or in combination with one or more of the first through fifteenth aspects, process 600 includes determining an initial quantization level associated with the update, determining a size of the update, determining a payload size capable of being carried by the quantity of scheduled uplink resources, determining that the size of the update is larger than the payload size, and determining a decreased quantization level that is lower than the initial quantization level based at least in part on determining that the size of the update is larger than the payload size.

In a seventeenth aspect, alone or in combination with one or more of the first through sixteenth aspects, process 600 includes determining a size of the update, determining a payload size capable of being carried by the quantity of scheduled uplink resources, and determining that the size of the update is larger than the payload size, wherein transmitting the update comprises transmitting a first portion of the update in a first packet, and transmitting a second portion of the update in a second packet.

In an eighteenth aspect, alone or in combination with one or more of the first through seventeenth aspects, transmitting the update comprises transmitting the update using at least one of an uplink MAC CE, an RRC message, a UCI on transmission, or a combination thereof.

In a nineteenth aspect, alone or in combination with one or more of the first through eighteenth aspects, determining the update comprises determining a locally updated customization feature vector.

In a twentieth aspect, alone or in combination with one or more of the first through nineteenth aspects, transmitting the update comprises quantizing the locally updated customization feature vector to generate a quantized update, and transmitting the quantized update.

In a twenty-first aspect, alone or in combination with one or more of the first through twentieth aspects, quantizing the locally updated customization feature vector comprises quantizing each of the plurality of elements.

In a twenty-second aspect, alone or in combination with one or more of the first through twenty-first aspects, process 600 includes determining an indication of a bit size corresponding to the quantized update, wherein the quantized update comprises a fixed bit number, and wherein the fixed bit number comprises the bit size.

In a twenty-third aspect, alone or in combination with one or more of the first through twenty-second aspects, the indication of the bit size is carried in at least one of the customization feature vector configuration, an RRC message, a DCI transmission, a MAC CE, or a combination thereof.

In a twenty-fourth aspect, alone or in combination with one or more of the first through twenty-third aspects, process 600 includes determining an indication of a maximum bit size corresponding to the quantized update, wherein the quantized update comprises a variable bit number, and wherein the variable bit number comprises a bit size that is less than or equal to the maximum bit size.

In a twenty-fifth aspect, alone or in combination with one or more of the first through twenty-fourth aspects, process 600 includes transmitting a quantization capability indication that indicates a maximum bit size for quantization of customization feature vector updates, wherein the maximum bit size is based at least in part on the quantization capability indication.

In a twenty-sixth aspect, alone or in combination with one or more of the first through twenty-fifth aspects, process 600 includes receiving a resource allocation for transmitting the update, and wherein the maximum bit size is based at least in part on the resource allocation.

In a twenty-seventh aspect, alone or in combination with one or more of the first through twenty-sixth aspects, the indication of the bit size is carried in at least one of the customization feature vector configuration, an RRC message, a DCI transmission, a MAC CE, or a combination thereof.

In a twenty-eighth aspect, alone or in combination with one or more of the first through twenty-seventh aspects, the quantized update comprises a non-uniform quantization of one or more elements of the locally updated customization feature vector.

In a twenty-ninth aspect, alone or in combination with one or more of the first through twenty-eighth aspects, process 600 includes receiving an indication of a non-uniform quantization scheme, wherein the non-uniform quantization is based at least in part on the indication of the non-uniform quantization scheme, wherein the non-uniform quantization scheme is carried in at least one of the customization feature vector configuration, an RRC message, a DCI transmission, a MAC CE, or a combination thereof.

In a thirtieth aspect, alone or in combination with one or more of the first through twenty-ninth aspects, process 600 includes transmitting a non-uniform quantization capability indication, wherein the non-uniform quantization scheme is based at least in part on the non-uniform quantization capability.

In a thirty-first aspect, alone or in combination with one or more of the first through thirtieth aspects, process 600 includes transmitting a non-uniform quantization suggestion, wherein the non-uniform quantization scheme is based at least in part on the non-uniform quantization suggestion.

In a thirty-second aspect, alone or in combination with one or more of the first through thirty-first aspects, process 600 includes receiving a latent vector configuration that indicates a periodic reporting procedure for reporting updates corresponding to at least one latent vector, determining an update corresponding to the at least one latent vector using an additional machine learning component, and transmitting the update corresponding to the at least one latent vector based at least in part on the latent vector configuration.

In a thirty-third aspect, alone or in combination with one or more of the first through thirty-second aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the customization feature vector configuration indicates a second periodicity associated with reporting the updates corresponding to the at least one customization feature vector, wherein the second periodicity comprises an amount of time between consecutive transmissions of the updates corresponding to the at least one customization feature vector.

In a thirty-fourth aspect, alone or in combination with one or more of the first through thirty-third aspects, the first periodicity is smaller than the second periodicity.

In a thirty-fifth aspect, alone or in combination with one or more of the first through thirty-fourth aspects, the latent vector configuration is carried in at least one of an RRC message, a MAC CE, or a combination thereof.

In a thirty-sixth aspect, alone or in combination with one or more of the first through thirty-fifth aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the customization feature vector configuration indicates a scaling factor for determining a second periodicity relative to the first periodicity, wherein the second periodicity comprises an amount of time between consecutive transmissions of the updates corresponding to the at least one customization feature vector.

In a thirty-seventh aspect, alone or in combination with one or more of the first through thirty-sixth aspects, process 600 includes determining the second periodicity based at least in part on the first periodicity and the scaling factor.

In a thirty-eighth aspect, alone or in combination with one or more of the first through thirty-seventh aspects, process 600 includes transmitting an indication of the second periodicity.

In a thirty-ninth aspect, alone or in combination with one or more of the first through thirty-eighth aspects, the scaling factor comprises an explicit scaling factor.

In a fortieth aspect, alone or in combination with one or more of the first through thirty-ninth aspects, the customization feature vector configuration comprises a scaling factor table that maps the first periodicity to one or more second periodicity options.

In a forty-first aspect, alone or in combination with one or more of the first through fortieth aspects, process 600 includes selecting the second periodicity from the one or more second periodicity options.

In a forty-second aspect, alone or in combination with one or more of the first through forty-first aspects, the scaling factor comprises an implicit scaling factor, wherein the first periodicity maps to the second periodicity.

In a forty-third aspect, alone or in combination with one or more of the first through forty-second aspects, process 600 includes identifying a collision between a scheduled transmission of an update corresponding to the at least one latent vector and a scheduled transmission of an update corresponding to the at least one customization feature vector, and transmitting the scheduled transmission of the update corresponding to the at least one customization feature vector.

In a forty-fourth aspect, alone or in combination with one or more of the first through forty-third aspects, the at least one customization feature vector comprises a plurality of customization feature vectors, and wherein the customization feature vector configuration indicates an ordering associated with transmitting a plurality of updates corresponding to the plurality of customization feature vectors.

In a forty-fifth aspect, alone or in combination with one or more of the first through forty-fourth aspects, process 600 includes identifying a collision between a scheduled transmission of the plurality of updates corresponding to the plurality of customization feature vectors and an additional transmission, and refraining from transmitting an end portion of a report comprising the plurality of updates corresponding to the plurality of customization feature vectors based at least in part on identifying the collision.

In a forty-sixth aspect, alone or in combination with one or more of the first through forty-fifth aspects, process 600 includes receiving a resource allocation associated with a scheduled transmission of the plurality of updates corresponding to the plurality of customization feature vectors and an additional transmission, determining that the resource allocation is insufficient to transmit a report comprising the plurality of updates corresponding to the plurality of customization feature vectors, and refraining from transmitting an end portion of the report based at least in part on determining that the resource allocation is insufficient to transmit the report.

In a forty-seventh aspect, alone or in combination with one or more of the first through forty-sixth aspects, the at least one customization feature vector comprises a plurality of customization feature vectors and wherein the at least one latent vector comprises a plurality of latent vectors, and wherein the transmitting the update comprises transmitting, according to an ordering, a first plurality of updates, wherein the first plurality of updates correspond to the plurality of customization feature vectors, and transmitting, according to the ordering, a second plurality of updates, wherein the second plurality of updates correspond to the plurality of latent vectors.

In a forty-eighth aspect, alone or in combination with one or more of the first through forty-seventh aspects, transmitting the first plurality of updates and the second plurality of updates according to the ordering comprises transmitting the first plurality of updates prior to transmitting the second plurality of updates.

In a forty-ninth aspect, alone or in combination with one or more of the first through forty-eighth aspects, transmitting the first plurality of updates and the second plurality of updates according to the ordering comprises transmitting a first update of the first plurality of updates, transmitting, after the first update, a second update of the second plurality of updates, transmitting, after transmitting the second update, a third update of the first plurality of updates, and transmitting, after transmitting the third update, a fourth update of the second plurality of updates.

In a fiftieth aspect, alone or in combination with one or more of the first through forty-ninth aspects, process 600 includes receiving a latent vector configuration that indicates a dynamic reporting procedure for reporting updates corresponding to at least one latent vector, determining an update corresponding to the at least one latent vector using an additional machine learning component, and transmitting the update corresponding to the at least one latent vector based at least in part on the latent vector configuration.

In a fifty-first aspect, alone or in combination with one or more of the first through fiftieth aspects, the customization feature vector configuration comprises an indication to transmit the update corresponding to the at least one customization feature vector based at least in part on receiving a latent vector feedback request.

In a fifty-second aspect, alone or in combination with one or more of the first through fifty-first aspects, the latent vector feedback request is carried in at least one of a DCI transmission, a MAC CE, or a combination thereof.

In a fifty-third aspect, alone or in combination with one or more of the first through fifty-second aspects, the latent vector feedback request comprises a trigger that triggers transmission of an update corresponding to the at least one latent vector, and wherein the trigger further triggers transmission of the update corresponding to the at least one customization feature vector.

In a fifty-fourth aspect, alone or in combination with one or more of the first through fifty-third aspects, process 600 includes transmitting a feedback resource request, wherein the feedback resource request comprises a request for a first set of resources for transmitting the update corresponding to the at least one latent vector, a second set of resources for transmitting the update corresponding to the at least one customization feature vector, or a combination thereof.

In a fifty-fifth aspect, alone or in combination with one or more of the first through fifty-fourth aspects, process 600 includes determining an occurrence of an update reporting trigger event, and transmitting, based at last on determining the occurrence of the update reporting trigger event, at least one of the update corresponding to the at least one customization feature vector or the update corresponding to the at least one latent vector.

In a fifty-sixth aspect, alone or in combination with one or more of the first through fifty-fifth aspects, determining the update corresponding to the at least one latent vector comprises determining a locally updated latent vector based at least in part on a previously reported customization feature vector.

In a fifty-seventh aspect, alone or in combination with one or more of the first through fifty-sixth aspects, determining the update corresponding to the at least one latent vector comprises determining a locally updated latent vector based at least in part on a default customization feature vector.

In a fifty-eighth aspect, alone or in combination with one or more of the first through fifty-seventh aspects, the default customization vector comprises an initial customization vector that was determined at an initialization phase.

In a fifty-ninth aspect, alone or in combination with one or more of the first through fifty-eighth aspects, the default customization vector comprises an initial customization vector that was determined at a setup phase.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a server, in accordance with the present disclosure. Example process 700 is an example where the server (e.g., server 510 shown in FIG. 5, and/or server 404 shown in FIG. 4) performs operations associated with customization feature vector feedback for machine learning components in wireless communication.

As shown in FIG. 7, in some aspects, process 700 may include transmitting a customization feature vector feedback configuration associated with a reporting procedure for reporting updates corresponding to at least one customization feature vector that is based at least in part on a machine learning component and one or more features associated with an environment of a client (block 710). For example, the server (e.g., using transmission component 1106, depicted in FIG. 11) may transmit a customization feature vector feedback configuration associated with a reporting procedure for reporting updates corresponding to at least one customization feature vector that is based at least in part on a machine learning component and one or more features associated with an environment of a client, as described above.

As further shown in FIG. 7, in some aspects, process 700 may include receiving an update corresponding to the at least one customization feature vector based at least in part on the configuration (block 720). For example, the server (e.g., using reception component 1102, depicted in FIG. 11) may receive an update corresponding to the at least one customization feature vector based at least in part on the configuration, as described above.

Process 700 may include additional aspects, such as any single aspect or any combination of aspects described below and/or in connection with one or more other processes described elsewhere herein.

In a first aspect, the machine learning component comprises at least one neural network.

In a second aspect, alone or in combination with the first aspect, the at least one neural network comprises at least one autoencoder.

In a third aspect, alone or in combination with one or more of the first and second aspects, the update comprises a set of values corresponding to the at least one customization feature vector.

In a fourth aspect, alone or in combination with one or more of the first through third aspects, the update comprises a locally updated customization feature vector.

In a fifth aspect, alone or in combination with one or more of the first through fourth aspects, the update comprises a subset of elements of a locally updated customization feature vector that are different than a corresponding subset of elements of a previously received update.

In a sixth aspect, alone or in combination with one or more of the first through fifth aspects, the at least one customization feature vector comprises a plurality of customization feature vectors.

In a seventh aspect, alone or in combination with one or more of the first through sixth aspects, the plurality of customization feature vectors corresponds to a plurality of communication parameters.

In an eighth aspect, alone or in combination with one or more of the first through seventh aspects, the plurality of communication parameters indicate at least one of a component carrier, a bandwidth part, a band, a band combination, a frequency range, a use case, a neural network identifier, or a combination thereof.

In a ninth aspect, alone or in combination with one or more of the first through eighth aspects, the use case comprises at least one of a channel state information derivation, a positioning measurement derivation, demodulation of a data channel, or a combination thereof.

In a tenth aspect, alone or in combination with one or more of the first through ninth aspects, a first customization feature vector of the plurality of customization feature vectors corresponds to a first communication parameter of the plurality of communication parameters, and wherein a second customization feature vector of the plurality of customization feature vectors corresponds to a second communication parameter of the plurality of communication parameters.

In an eleventh aspect, alone or in combination with one or more of the first through tenth aspects, process 700 includes receiving a capability report that indicates a number of customization feature vectors that the client can support, wherein the customization feature vector configuration is based at least in part on the capability report.

In a twelfth aspect, alone or in combination with one or more of the first through eleventh aspects, the customization feature vector configuration indicates a transmission parameter that indicates a quantity of scheduled uplink resources that can be used to carry one or more portions of the update.

In a thirteenth aspect, alone or in combination with one or more of the first through twelfth aspects, the quantity of the scheduled uplink resources comprises a percentage of a set of allocated uplink resources.

In a fourteenth aspect, alone or in combination with one or more of the first through thirteenth aspects, the set of allocated uplink resources correspond to at least one of a physical uplink control channel, a physical uplink shared channel, or a combination thereof.

In a fifteenth aspect, alone or in combination with one or more of the first through fourteenth aspects, the update comprises a decreased quantization level that is lower than an initial quantization level based at least in part on a determination that a size of the update is larger than a payload size.

In a sixteenth aspect, alone or in combination with one or more of the first through fifteenth aspects, process 700 includes receiving a first portion of the update in a first packet, and receiving a second portion of the update in a second packet.

In a seventeenth aspect, alone or in combination with one or more of the first through sixteenth aspects, the update is carried in at least one of an uplink MAC CE, an RRC message, a UCI transmission, or a combination thereof.

In an eighteenth aspect, alone or in combination with one or more of the first through seventeenth aspects, the update comprises a locally updated customization feature vector.

In a nineteenth aspect, alone or in combination with one or more of the first through eighteenth aspects, the update comprises a quantized update including a plurality of quantized elements.

In a twentieth aspect, alone or in combination with one or more of the first through nineteenth aspects, process 700 includes transmitting an indication of a bit size, wherein the quantized update comprises a fixed bit number, and wherein the fixed bit number comprises the bit size.

In a twenty-first aspect, alone or in combination with one or more of the first through twentieth aspects, the indication of the bit size is carried in at least one of the customization feature vector configuration, an RRC message, a DCI transmission, a MAC CE, or a combination thereof.

In a twenty-second aspect, alone or in combination with one or more of the first through twenty-first aspects, process 700 includes transmitting an indication of a maximum bit size corresponding to the quantized update, wherein the quantized update comprises a variable bit number, and wherein the variable bit number comprises a bit size that is less than or equal to the maximum bit size.

In a twenty-third aspect, alone or in combination with one or more of the first through twenty-second aspects, process 700 includes receiving a quantization capability indication that indicates a maximum bit size for quantization of customization feature vector updates, wherein the maximum bit size is based at least in part on the quantization capability indication.

In a twenty-fourth aspect, alone or in combination with one or more of the first through twenty-third aspects, process 700 includes transmitting a resource allocation for transmitting the update, and wherein the maximum bit size is based at least in part on the resource allocation.

In a twenty-fifth aspect, alone or in combination with one or more of the first through twenty-fourth aspects, the indication of the maximum bit size is carried in at least one of the customization feature vector configuration, an RRC control message, a DCI transmission, a MAC CE, or a combination thereof.

In a twenty-sixth aspect, alone or in combination with one or more of the first through twenty-fifth aspects, the quantized update comprises a non-uniform quantization of one or more elements of the locally updated customization feature vector.

In a twenty-seventh aspect, alone or in combination with one or more of the first through twenty-sixth aspects, process 700 includes transmitting an indication of a non-uniform quantization scheme, wherein the non-uniform quantization is based at least in part on the indication of the non-uniform quantization scheme, wherein the non-uniform quantization scheme is carried in at least one of the customization feature vector configuration, an RRC message, a DCI transmission, a MAC CE, or a combination thereof.

In a twenty-eighth aspect, alone or in combination with one or more of the first through twenty-seventh aspects, process 700 includes receiving a non-uniform quantization capability indication, wherein the non-uniform quantization scheme is based at least in part on the non-uniform quantization capability.

In a twenty-ninth aspect, alone or in combination with one or more of the first through twenty-eighth aspects, process 700 includes receiving a non-uniform quantization suggestion, wherein the non-uniform quantization scheme is based at least in part on the non-uniform quantization suggestion.

In a thirtieth aspect, alone or in combination with one or more of the first through twenty-ninth aspects, process 700 includes transmitting a latent vector configuration that indicates a periodic reporting procedure for reporting updates corresponding to at least one latent vector, and receiving an update corresponding to the at least one latent vector based at least in part on the latent vector configuration.

In a thirty-first aspect, alone or in combination with one or more of the first through thirtieth aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the customization feature vector configuration indicates a second periodicity associated with reporting the updates corresponding to the at least one customization feature vector, wherein the second periodicity comprises an amount of time between consecutive transmissions of the updates corresponding to the at least one customization feature vector.

In a thirty-second aspect, alone or in combination with one or more of the first through thirty-first aspects, the first periodicity is smaller than the second periodicity.

In a thirty-third aspect, alone or in combination with one or more of the first through thirty-second aspects, the latent vector configuration is carried in at least one of an RRC message, a MAC CE, or a combination thereof.

In a thirty-fourth aspect, alone or in combination with one or more of the first through thirty-third aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the customization feature vector configuration indicates a scaling factor for determining a second periodicity relative to the first periodicity, wherein the second periodicity comprises an amount of time between consecutive transmissions of the updates corresponding to the at least one customization feature vector.

In a thirty-fifth aspect, alone or in combination with one or more of the first through thirty-fourth aspects, process 700 includes receiving an indication of the second periodicity.

In a thirty-sixth aspect, alone or in combination with one or more of the first through thirty-fifth aspects, the scaling factor comprises an explicit scaling factor.

In a thirty-seventh aspect, alone or in combination with one or more of the first through thirty-sixth aspects, the customization feature vector configuration comprises a scaling factor table that maps the first periodicity to one or more second periodicity options.

In a thirty-eighth aspect, alone or in combination with one or more of the first through thirty-seventh aspects, the scaling factor comprises an implicit scaling factor, wherein the first periodicity maps to the second periodicity.

In a thirty-ninth aspect, alone or in combination with one or more of the first through thirty-eighth aspects, the at least one customization feature vector comprises a plurality of customization feature vectors, and wherein the customization feature vector configuration indicates an ordering associated with transmitting a plurality of updates corresponding to the plurality of customization feature vectors.

In a fortieth aspect, alone or in combination with one or more of the first through thirty-ninth aspects, the at least one customization feature vector comprises a plurality of customization feature vectors and wherein the at least one latent vector comprises a plurality of latent vectors, and wherein the receiving the update comprises receiving, according to an ordering, a first plurality of updates, wherein the first plurality of updates correspond to the plurality of customization feature vectors, and receiving, according to the ordering, a second plurality of updates, wherein the second plurality of updates correspond to the plurality of latent vectors.

In a forty-first aspect, alone or in combination with one or more of the first through fortieth aspects, receiving the first plurality of updates and the second plurality of updates according to the ordering comprises receiving the first plurality of updates prior to receiving the second plurality of updates.

In a forty-second aspect, alone or in combination with one or more of the first through forty-first aspects, receiving the first plurality of updates and the second plurality of updates according to the ordering comprises receiving a first update of the first plurality of updates, receiving, after receiving the first update, a second update of the second plurality of updates, receiving, after receiving the second update, a third update of the first plurality of updates, and receiving, after receiving the third update, a fourth update of the second plurality of updates.

In a forty-third aspect, alone or in combination with one or more of the first through forty-second aspects, process 700 includes transmitting a latent vector configuration that indicates a dynamic reporting procedure for reporting updates corresponding to at least one latent vector, and receiving an update corresponding to the at least one latent vector based at least in part on the latent vector configuration.

In a forty-fourth aspect, alone or in combination with one or more of the first through forty-third aspects, the customization feature vector configuration comprises an indication to transmit the update corresponding to the at least one customization feature vector based at least in part on receiving a latent vector feedback request.

In a forty-fifth aspect, alone or in combination with one or more of the first through forty-fourth aspects, the latent vector feedback request is carried in at least one of a DCI transmission, a MAC CE, or a combination thereof.

In a forty-sixth aspect, alone or in combination with one or more of the first through forty-fifth aspects, the latent vector feedback request comprises a trigger that triggers transmission of an update corresponding to the at least one latent vector, and wherein the trigger further triggers transmission of the update corresponding to the at least one customization feature vector.

In a forty-seventh aspect, alone or in combination with one or more of the first through forty-sixth aspects, process 700 includes receiving a feedback resource request, wherein the feedback resource request comprises a request for a first set of resources for transmitting the update corresponding to the at least one latent vector, a second set of resources for transmitting the update corresponding to the at least one customization feature vector, or a combination thereof.

In a forty-eighth aspect, alone or in combination with one or more of the first through forty-seventh aspects, process 700 includes receiving, based at last on a determination of an occurrence of an update reporting trigger event, at least one of the update corresponding to the at least one customization feature vector or the update corresponding to the at least one latent vector.

In a forty-ninth aspect, alone or in combination with one or more of the first through forty-eighth aspects, the update corresponding to the at least one latent vector comprises a locally updated latent vector based at least in part on a previously reported customization feature vector.

In a fiftieth aspect, alone or in combination with one or more of the first through forty-ninth aspects, the update corresponding to the at least one latent vector comprises a locally updated latent vector based at least in part on a default customization feature vector.

In a fifty-first aspect, alone or in combination with one or more of the first through fiftieth aspects, the default customization vector comprises an initial customization vector that was determined at an initialization phase.

In a fifty-second aspect, alone or in combination with one or more of the first through fifty-first aspects, the default customization vector comprises an initial customization vector that was determined at a setup phase.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
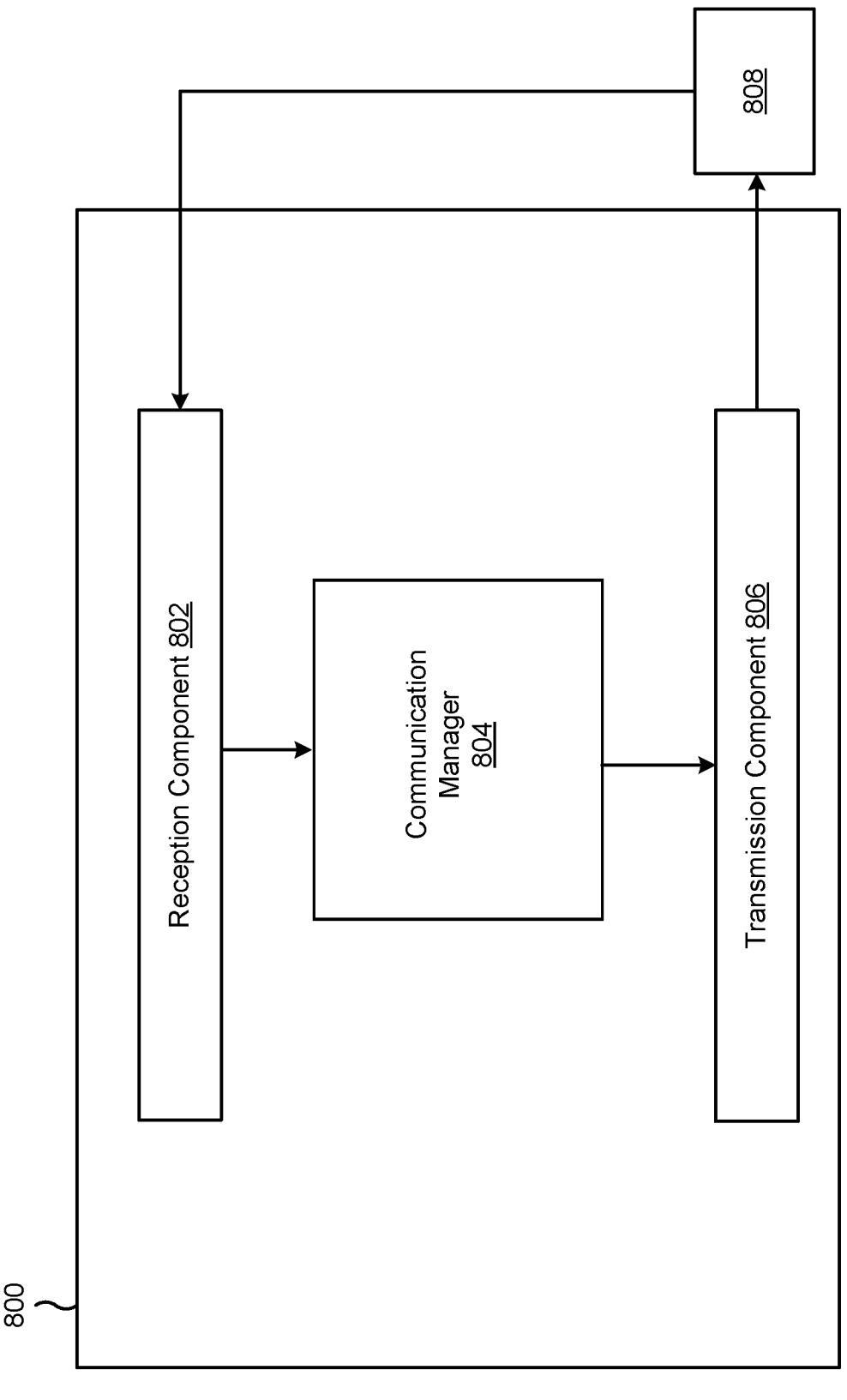
FIGS. 8-13 are examples of apparatuses for implementing clients and/or servers, in accordance with the present disclosure.

FIG. 8 is a block diagram of an example apparatus 800 for wireless communication in accordance with the present disclosure. The apparatus 800 may be, be similar to, include, or be included in a client (e.g., client 505 shown in FIG. 5 and/or client 402 shown in FIG. 4). In some aspects, the apparatus 800 includes a reception component 802, a communication manager 804, and a transmission component 806, which may be in communication with one another (for example, via one or more buses). As shown, the apparatus 800 may communicate with another apparatus 808 (such as a client, a server, a UE, a base station, or another wireless communication device) using the reception component 802 and the transmission component 806.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, process 700 of FIG. 7. In some aspects, the apparatus 800 may include one or more components of the first UE described above in connection with FIG. 2.

The reception component 802 may provide means for receiving communications, such as reference signals, control information, data communications, or a combination thereof, from the apparatus 808. The reception component 802 may provide received communications to one or more other components of the apparatus 800, such as the communication manager 804. In some aspects, the reception component 802 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the first UE described above in connection with FIG. 2.

The transmission component 806 may provide means for transmitting communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may provide means for performing signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the first UE described above in connection with FIG. 2. In some aspects, the transmission component 806 may be co-located with the reception component 802 in a transceiver.

In some aspects, the communication manager 804 may provide means for receiving a customization feature vector feedback configuration associated with a reporting procedure for reporting updates corresponding to at least one customization feature vector that is based at least in part on one or more features associated with an environment of the client; means for determining an update corresponding to the at least one customization feature vector using a machine learning component; and means for transmitting the update based at least in part on the customization feature vector feedback configuration. In some aspects, the communication manager 804 may include a controller/processor, a memory, or a combination thereof, of the first UE described above in connection with FIG. 2. In some aspects, the communication manager 804 may include the reception component 802, the transmission component 806, and/or the like. In some aspects, the means provided by the communication manager 804 may include, or be included within means provided by the reception component 802, the transmission component 806, and/or the like.

In some aspects, the communication manager 804 and/or one or more components of the communication manager 804 may include or may be implemented within hardware (e.g., one or more of the circuitry described in connection with FIG. 20). In some aspects, the communication manager 804 and/or one or more components thereof may include or may be implemented within a controller/processor, a memory, or a combination thereof, of the UE 120 described above in connection with FIG. 2.

In some aspects, the communication manager 804 and/or one or more components of the communication manager 804 may be implemented in code (e.g., as software or firmware stored in a memory), such as the code described in connection with FIG. 10. For example, the communication manager 804 and/or a component (or a portion of a component) of the communication manager 804 may be implemented as instructions or code stored in a non-transitory computer-readable medium and executable by a controller or a processor to perform the functions or operations of the communication manager 804 and/or the component. If implemented in code, the functions of the communication manager 804 and/or a component may be executed by a controller/processor, a memory, a scheduler, a communication unit, or a combination thereof, of the UE 120 described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
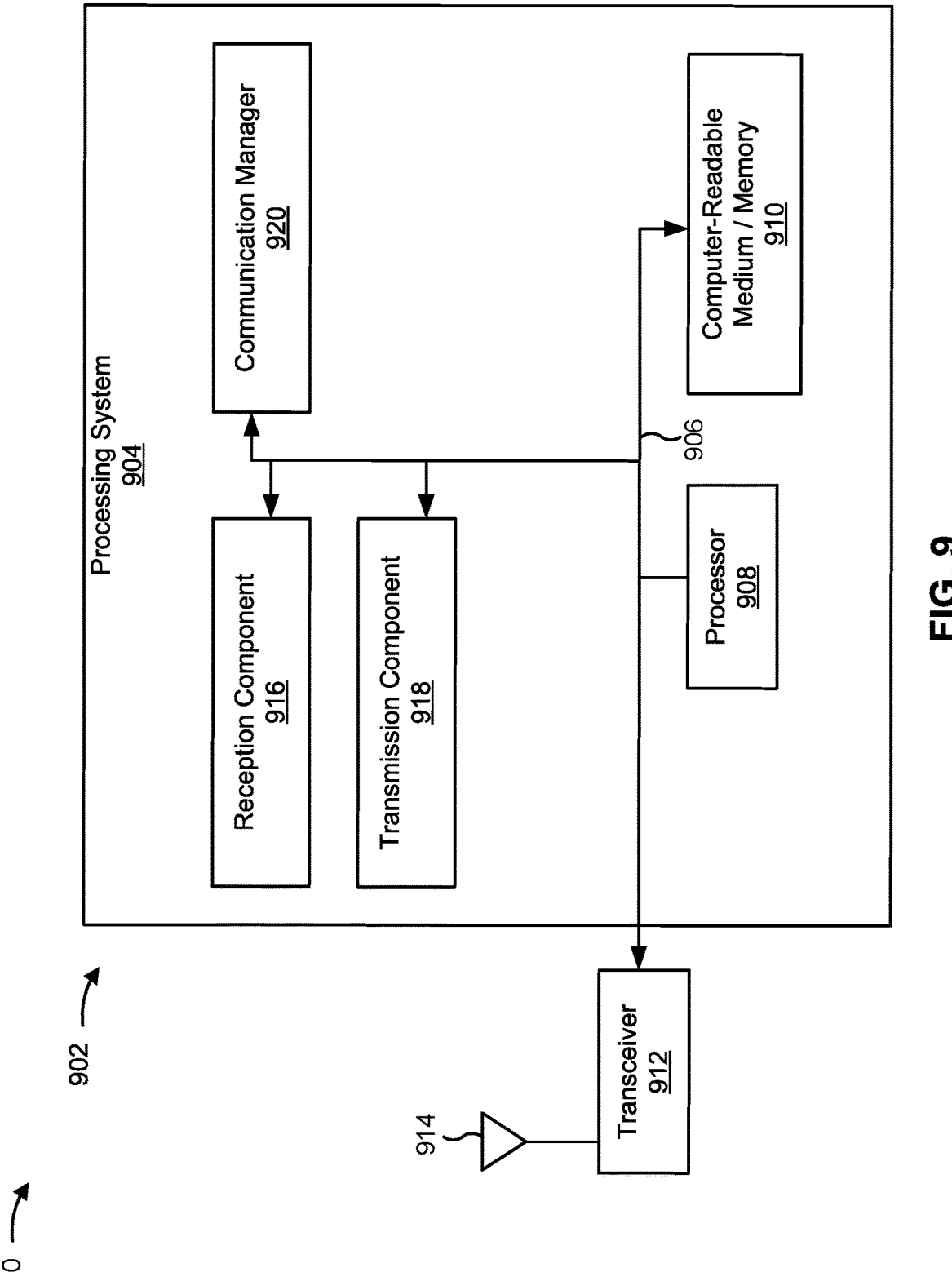

FIG. 9 is a diagram illustrating an example 900 of a hardware implementation for an apparatus 902 employing a processing system 904. The apparatus 902 may be, be similar to, include, or be included in the apparatus 800 shown in FIG. 8.

The processing system 904 may be implemented with a bus architecture, represented generally by the bus 906. The bus 906 may include any number of interconnecting buses and bridges depending on the specific application of the processing system 904 and the overall design constraints. The bus 906 links together various circuits including one or more processors and/or hardware components, represented by a processor 908, the illustrated components, and the computer-readable medium/memory 910. The bus 906 may also link various other circuits, such as timing sources, peripherals, voltage regulators, power management circuits, and/or the like.

The processing system 904 may be coupled to a transceiver 912. The transceiver 912 is coupled to one or more antennas 914. The transceiver 912 provides a means for communicating with various other apparatuses over a transmission medium. The transceiver 912 receives a signal from the one or more antennas 914, extracts information from the received signal, and provides the extracted information to the processing system 904, specifically a reception component 916. In addition, the transceiver 912 receives information from the processing system 904, specifically a transmission component 918, and generates a signal to be applied to the one or more antennas 914 based at least in part on the received information.

The processor 908 is coupled to the computer-readable medium/memory 910. The processor 908 is responsible for general processing, including the execution of software stored on the computer-readable medium/memory 910. The software, when executed by the processor 908, causes the processing system 904 to perform the various functions described herein in connection with a client. The computer-readable medium/memory 910 may also be used for storing data that is manipulated by the processor 908 when executing software. The processing system 904 may include any number of additional components not illustrated in FIG. 9. The components illustrated and/or not illustrated may be software modules running in the processor 908, resident/stored in the computer readable medium/memory 910, one or more hardware modules coupled to the processor 908, or some combination thereof.

In some aspects, the processing system 904 may be a component of the UE 120 and may include the memory 282 and/or at least one of the TX MIMO processor 266, the RX processor 258, and/or the controller/processor 280. In some aspects, the apparatus 902 for wireless communication provides means for receiving a customization feature vector feedback configuration associated with a reporting procedure for reporting updates corresponding to at least one customization feature vector that is based at least in part on one or more features associated with an environment of the client; means for determining an update corresponding to the at least one customization feature vector using a machine learning component; and means for transmitting the update based at least in part on the customization feature vector feedback configuration. The aforementioned means may be one or more of the aforementioned components of the processing system 904 of the apparatus 902 configured to perform the functions recited by the aforementioned means. As described elsewhere herein, the processing system 904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
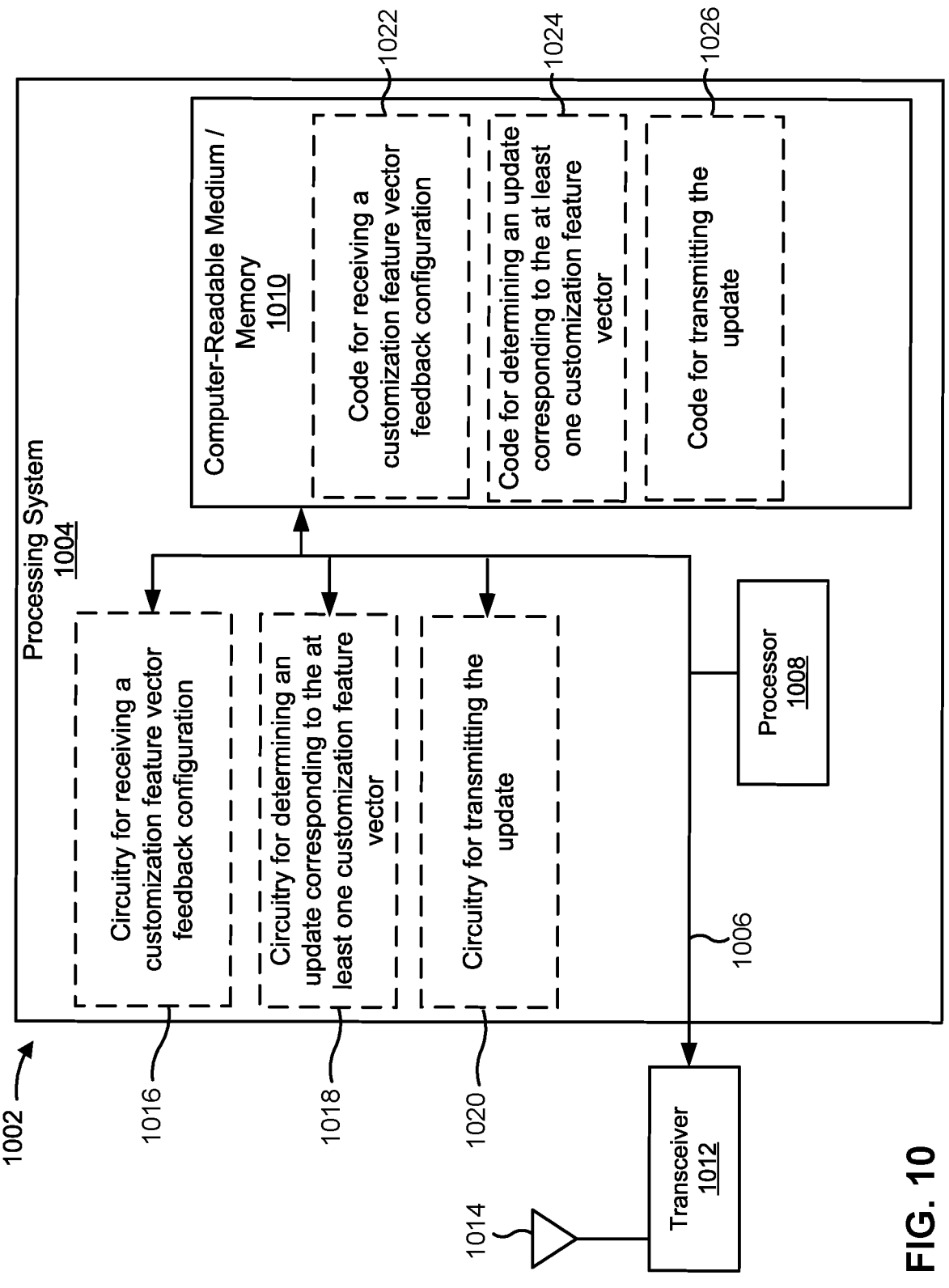

FIG. 10 is a diagram illustrating an example 1000 of an implementation of code and circuitry for an apparatus 1002 for wireless communication. The apparatus 1002 may be, be similar to, include, or be included in the apparatus 902 shown in FIG. 9 and/or the apparatus 800 shown in FIG. 8. The apparatus 1002 may include a processing system 1004, which may include a bus 1006 coupling one or more components such as, for example, a processor 1008, computer-readable medium/memory 1010, a transceiver 1012, and/or the like. As shown, the transceiver 1012 may be coupled to one or more antenna 1014.

As further shown in FIG. 10, the apparatus 1002 may include circuitry for receiving a customization feature vector feedback configuration associated with a reporting procedure for reporting updates corresponding to at least one customization feature vector that is based at least in part on one or more features associated with an environment of the client (circuitry 1016). For example, the apparatus 1002 may include circuitry 1016 to enable the apparatus 1002 to receive a customization feature vector feedback configuration associated with a reporting procedure for reporting updates corresponding to at least one customization feature vector that is based at least in part on one or more features associated with an environment of the client.

As further shown in FIG. 10, the apparatus 1002 may include circuitry for determining an update corresponding to the at least one customization feature vector using a machine learning component (circuitry 1018). For example, the apparatus 1002 may include circuitry 1018 to enable the apparatus 1002 to determine an update corresponding to the at least one customization feature vector using a machine learning component.

As further shown in FIG. 10, the apparatus 1002 may include circuitry for transmitting the update based at least in part on the customization feature vector feedback configuration (circuitry 1020). For example, the apparatus 1002 may include circuitry 1020 to enable the apparatus 1002 to transmit the update based at least in part on the customization feature vector feedback configuration.

As further shown in FIG. 10, the apparatus 1002 may include, stored in computer-readable medium 1010, code for receiving a customization feature vector feedback configuration associated with a reporting procedure for reporting updates corresponding to at least one customization feature vector that is based at least in part on one or more features associated with an environment of the client (code 1022). For example, the apparatus 1002 may include code 1022 that, when executed by the processor 1008, may cause the transceiver 1012 to receive a customization feature vector feedback configuration associated with a reporting procedure for reporting updates corresponding to at least one customization feature vector that is based at least in part on one or more features associated with an environment of the client.

As further shown in FIG. 10, the apparatus 1002 may include, stored in computer-readable medium 1010, code for determining an update corresponding to the at least one customization feature vector using a machine learning component (code 1024). For example, the apparatus 1002 may include code 1024 that, when executed by the processor 1008, may cause the processor 1008 to determine an update corresponding to the at least one customization feature vector using a machine learning component.

As further shown in FIG. 10, the apparatus 1002 may include, stored in computer-readable medium 1010, code for transmitting the update based at least in part on the customization feature vector feedback configuration (code 1026). For example, the apparatus 1002 may include code 1026 that, when executed by the processor 1008, may cause the transceiver 1012 to transmit the update based at least in part on the customization feature vector feedback configuration.

FIG. 10 is provided as an example. Other examples may differ from what is described in connection with FIG. 10.

Figure 11:
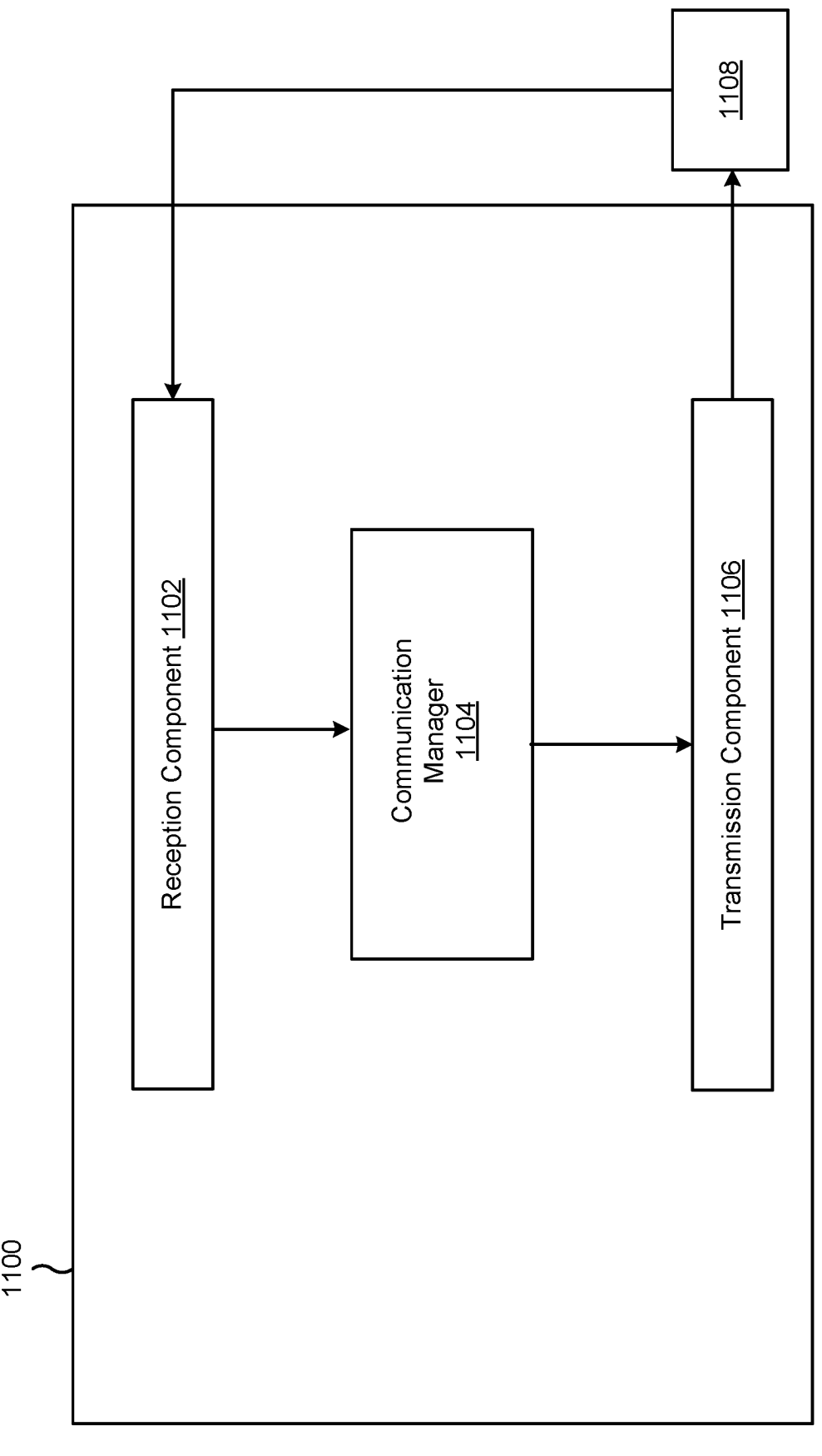

FIG. 11 is a block diagram of an example apparatus 1100 for wireless communication in accordance with the present disclosure. The apparatus 1100 may be, be similar to, include, or be included in a server (e.g., server 510 shown in FIG. 5 and/or server 404 shown in FIG. 4). In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a client, a server, a UE, a base station, or another wireless communication device) using the reception component 1102 and the transmission component 1106.

In some aspects, the apparatus 1100 may be configured to perform one or more operations described herein in connection with FIGS. 3-5. Additionally, or alternatively, the apparatus 1100 may be configured to perform one or more processes described herein, such as process 700 of FIG. 7. In some aspects, the apparatus 1100 may include one or more components of the base station described above in connection with FIG. 2.

The reception component 1102 may provide means for receiving communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may provide means for transmitting communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may provide means for performing signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be co-located with the reception component 1102 in a transceiver.

The communication manager 1104 may provide means for transmitting a customization feature vector feedback configuration associated with a reporting procedure for reporting updates corresponding to at least one customization feature vector that is based at least in part on a machine learning component and one or more features associated with an environment of a client; and means for receiving an update corresponding to the at least one customization feature vector based at least in part on the configuration. In some aspects, the communication manager 1104 may include a controller/processor, a memory, a scheduler, a communication unit, or a combination thereof, of the base station described above in connection with FIG. 2. In some aspects, the communication manager 1104 may include the reception component 1102, the transmission component 1106, and/or the like. In some aspects, the means provided by the communication manager 1104 may include, or be included within, means provided by the reception component 1102, the transmission component 1106, and/or the like.

In some aspects, the communication manager 1104 and/or one or more components thereof may include or may be implemented within hardware (e.g., one or more of the circuitry described in connection with FIG. 13). In some aspects, the communication manager 1104 and/or one or more components thereof may include or may be implemented within a controller/processor, a memory, or a combination thereof, of the BS 110 described above in connection with FIG. 2.

In some aspects, the communication manager 1104 and/or one or more components thereof may be implemented in code (e.g., as software or firmware stored in a memory), such as the code described in connection with FIG. 13. For example, the communication manager 1104 and/or a component (or a portion of a component) of the communication manager 1104 may be implemented as instructions or code stored in a non-transitory computer-readable medium and executable by a controller or a processor to perform the functions or operations of the communication manager 1104 and/or the component. If implemented in code, the functions of the communication manager 1104 and/or a component may be executed by a controller/processor, a memory, a scheduler, a communication unit, or a combination thereof, of the BS 110 described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
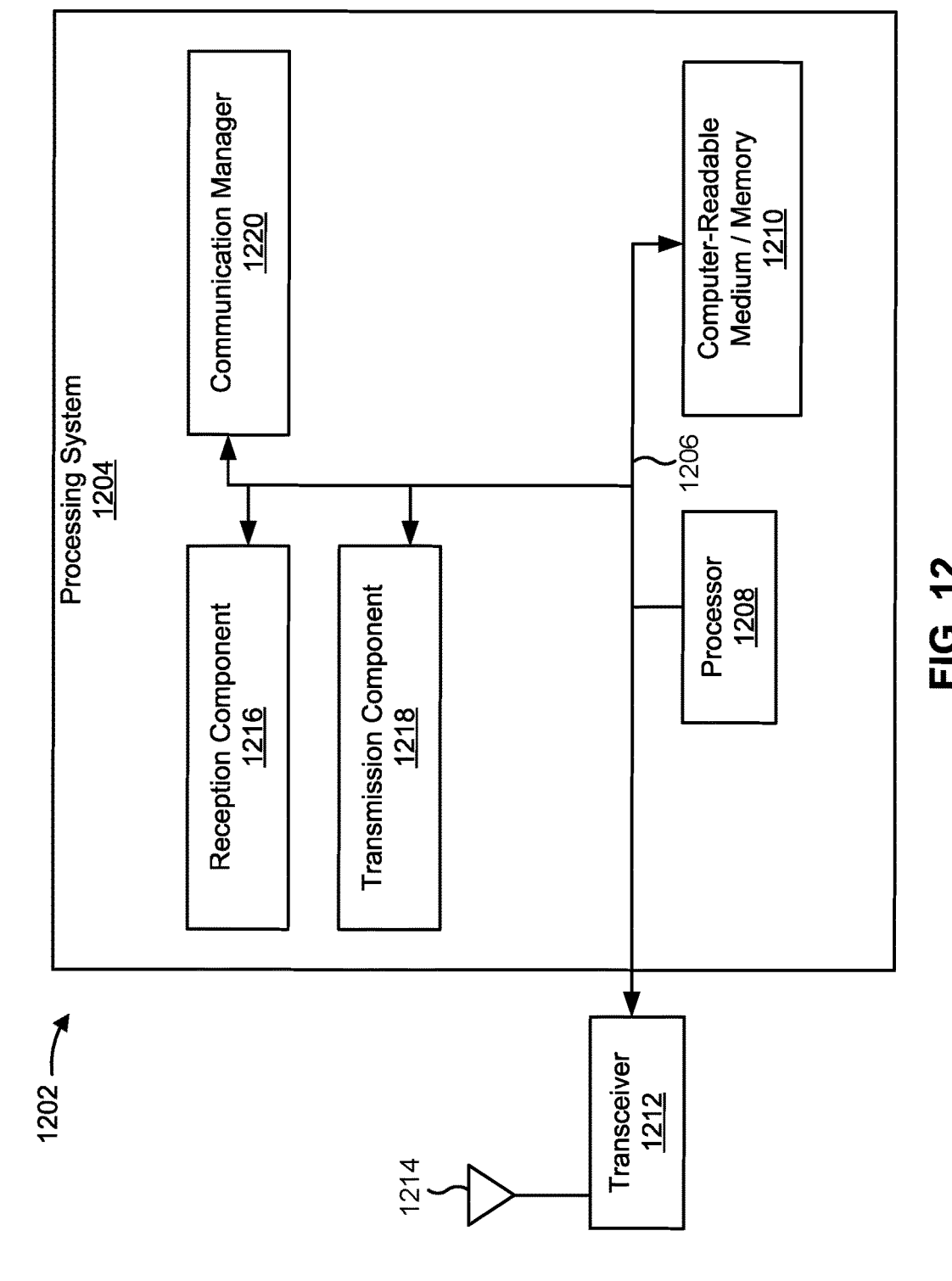

FIG. 12 is a diagram illustrating an example 1200 of a hardware implementation for an apparatus 1202 employing a processing system 1204. The apparatus 1202 may be, be similar to, include, or be included in the apparatus 1100 shown in FIG. 11.

The processing system 1204 may be implemented with a bus architecture, represented generally by the bus 1206. The bus 1206 may include any number of interconnecting buses and bridges depending on the specific application of the processing system 1204 and the overall design constraints. The bus 1206 links together various circuits including one or more processors and/or hardware components, represented by a processor 1208, the illustrated components, and the computer-readable medium/memory 1210. The bus 1206 may also link various other circuits, such as timing sources, peripherals, voltage regulators, power management circuits, and/or the like.

The processing system 1204 may be coupled to a transceiver 1212. The transceiver 1212 is coupled to one or more antennas 1214. The transceiver 1212 provides a means for communicating with various other apparatuses over a transmission medium. The transceiver 1212 receives a signal from the one or more antennas 1214, extracts information from the received signal, and provides the extracted information to the processing system 1204, specifically a reception component 1216. In addition, the transceiver 1212 receives information from the processing system 1204, specifically a transmission component 1218, and generates a signal to be applied to the one or more antennas 1214 based at least in part on the received information.

The processor 1208 is coupled to the computer-readable medium/memory 1210. The processor 1208 is responsible for general processing, including the execution of software stored on the computer-readable medium/memory 1210. The software, when executed by the processor 1208, causes the processing system 1204 to perform the various functions described herein in connection with a server. The computer-readable medium/memory 1210 may also be used for storing data that is manipulated by the processor 1208 when executing software. The processing system 1204 may include any number of additional components not illustrated in FIG. 12. The components illustrated and/or not illustrated may be software modules running in the processor 1208, resident/stored in the computer readable medium/memory 1210, one or more hardware modules coupled to the processor 1208, or some combination thereof.

In some aspects, the processing system 1204 may be a component of the UE 120 and may include the memory 282 and/or at least one of the TX MIMO processor 266, the RX processor 258, and/or the controller/processor 280. In some aspects, the apparatus 1202 for wireless communication provides means for transmitting a customization feature vector feedback configuration associated with a reporting procedure for reporting updates corresponding to at least one customization feature vector that is based at least in part on a machine learning component and one or more features associated with an environment of a client; and means for receiving an update corresponding to the at least one customization feature vector based at least in part on the configuration. The aforementioned means may be one or more of the aforementioned components of the processing system 1204 of the apparatus 1202 configured to perform the functions recited by the aforementioned means. As described elsewhere herein, the processing system 1204 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
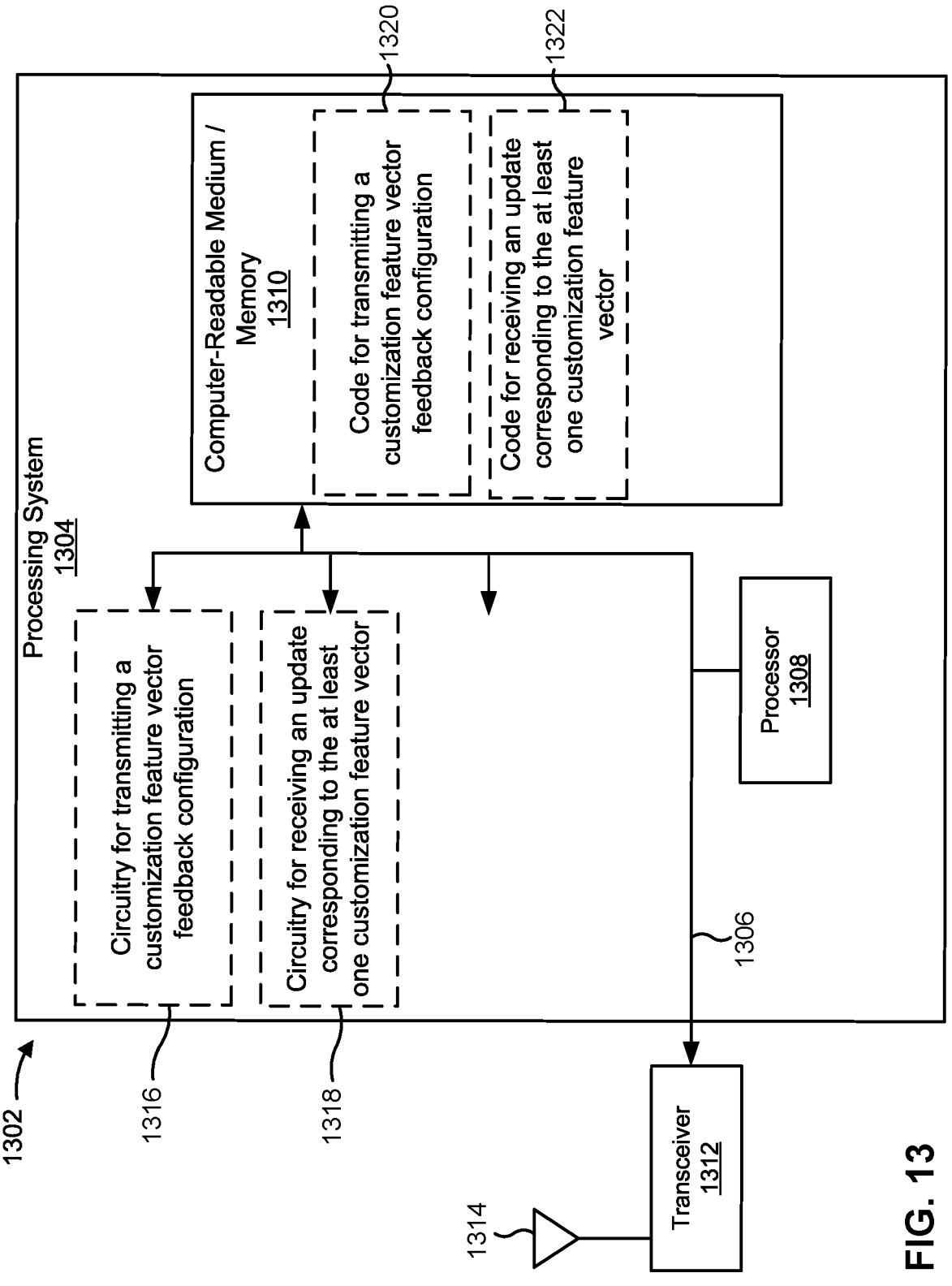

FIG. 13 is a diagram illustrating an example 1300 of an implementation of code and circuitry for an apparatus 1302 for wireless communication. The apparatus 1302 may be, be similar to, include, or be included in the apparatus 1202 shown in FIG. 12, and/or the apparatus 1100 shown in FIG. 11. The apparatus 1302 may include a processing system 1304, which may include a bus 1306 coupling one or more components such as, for example, a processor 1308, computer-readable medium/memory 1310, a transceiver 1312, and/or the like. As shown, the transceiver 1312 may be coupled to one or more antenna 1314.

As further shown in FIG. 13, the apparatus 1302 may include circuitry for transmitting a customization feature vector feedback configuration associated with a reporting procedure for reporting updates corresponding to at least one customization feature vector that is based at least in part on a machine learning component and one or more features associated with an environment of a client (circuitry 1316). For example, the apparatus 1302 may include circuitry 1316 to enable the apparatus 1302 to transmit a customization feature vector feedback configuration associated with a reporting procedure for reporting updates corresponding to at least one customization feature vector that is based at least in part on a machine learning component and one or more features associated with an environment of a client.

As further shown in FIG. 13, the apparatus 1302 may include circuitry for receiving an update corresponding to the at least one customization feature vector based at least in part on the configuration (circuitry 1318). For example, the apparatus 1302 may include circuitry 1318 to enable the apparatus 1302 to receive an update corresponding to the at least one customization feature vector based at least in part on the configuration.

As further shown in FIG. 13, the apparatus 1302 may include, stored in computer-readable medium 1310, code for transmitting a customization feature vector feedback configuration associated with a reporting procedure for reporting updates corresponding to at least one customization feature vector that is based at least in part on a machine learning component and one or more features associated with an environment of a client (code 1320). For example, the apparatus 1302 may include code 1320 that, when executed by the processor 1308, may cause the transceiver 1312 to transmit a customization feature vector feedback configuration associated with a reporting procedure for reporting updates corresponding to at least one customization feature vector that is based at least in part on a machine learning component and one or more features associated with an environment of a client.

As further shown in FIG. 13, the apparatus 1302 may include, stored in computer-readable medium 1310, code for receiving an update corresponding to the at least one customization feature vector based at least in part on the configuration (code 1322). For example, the apparatus 1302 may include code 1322 that, when executed by the processor 1308, may cause the transceiver 1312 to receive an update corresponding to the at least one customization feature vector based at least in part on the configuration.

FIG. 13 is provided as an example. Other examples may differ from what is described in connection with FIG. 13.

The following provides an overview of some Aspects of the present disclosure:

Aspect 1: A method of wireless communication performed by a client, comprising: receiving a customization feature vector feedback configuration associated with a reporting procedure for reporting updates corresponding to at least one customization feature vector that is based at least in part on one or more features associated with an environment of the client; determining an update corresponding to the at least one customization feature vector using a machine learning component; and transmitting the update based at least in part on the customization feature vector feedback configuration.

Aspect 2: The method of Aspect 1, wherein the machine learning component comprises at least one neural network.

Aspect 3: The method of Aspect 2, wherein the at least one neural network comprises at least one autoencoder.

Aspect 4: The method of any of Aspects 1-3, wherein determining the update comprises determining a set of values corresponding to the at least one customization feature vector.

Aspect 5: The method of any of Aspects 1-4, wherein the update comprises a locally updated customization feature vector.

Aspect 6: The method of any of Aspects 1-5, wherein the update comprises a subset of elements of a locally updated customization feature vector that are different than a corresponding subset of elements of a previously transmitted update.

Aspect 7: The method of any of Aspects 1-6, wherein the at least one customization feature vector comprises a plurality of customization feature vectors.

Aspect 8: The method of Aspect 7, wherein the plurality of customization feature vectors corresponds to a plurality of communication parameters.

Aspect 9: The method of Aspect 8, wherein the plurality of communication parameters indicate at least one of: a component carrier, a bandwidth part, a band, a band combination, a frequency range, a use case, a neural network identifier, or a combination thereof.

Aspect 10: The method of Aspect 9, wherein the use case comprises at least one of: a channel state information derivation, a positioning measurement derivation, demodulation of a data channel, or a combination thereof.

Aspect 11: The method of any of Aspects 9-10, wherein a first customization feature vector of the plurality of customization feature vectors corresponds to a first communication parameter of the plurality of communication parameters, and wherein a second customization feature vector of the plurality of customization feature vectors corresponds to a second communication parameter of the plurality of communication parameters.

Aspect 12: The method of any of Aspects 1-11, further comprising: transmitting a capability report that indicates a number of customization feature vectors that the client can support; wherein the customization feature vector configuration is based at least in part on the capability report.

Aspect 13: The method of any of Aspects 1-12, wherein the customization feature vector configuration indicates a transmission parameter that indicates a quantity of scheduled uplink resources that can be used to carry one or more portions of the update.

Aspect 14: The method of Aspect 13, wherein the quantity of the scheduled uplink resources comprises a percentage of a set of allocated uplink resources.

Aspect 15: The method of Aspect 14, wherein the set of allocated uplink resources correspond to at least one of: a physical uplink control channel, a physical uplink shared channel, or a combination thereof.

Aspect 16: The method of any of Aspects 13-15, further comprising: determining a size of the update; determining a payload size capable of being carried by the quantity of scheduled uplink resources; determining that the size of the update is larger than the payload size; and dropping a portion of the update based at least in part on determining that the size of the update is larger than the payload size.

Aspect 17: The method of any of Aspects 13-15, further comprising: determining an initial quantization level associated with the update; determining a size of the update; determining a payload size capable of being carried by the quantity of scheduled uplink resources; determining that the size of the update is larger than the payload size; and determining a decreased quantization level that is lower than the initial quantization level based at least in part on determining that the size of the update is larger than the payload size.

Aspect 18: The method of any of Aspects 13-15, further comprising: determining a size of the update; determining a payload size capable of being carried by the quantity of scheduled uplink resources; and determining that the size of the update is larger than the payload size, wherein transmitting the update comprises: transmitting a first portion of the update in a first packet; and transmitting a second portion of the update in a second packet.

Aspect 19: The method of any of Aspects 1-18, wherein transmitting the update comprises transmitting the update using at least one of: an uplink medium access control (MAC) control element, a radio resource control message, an uplink control information transmission, or a combination thereof.

Aspect 20: The method of any of Aspects 1-19, wherein determining the update comprises determining a locally updated customization feature vector.

Aspect 21: The method of Aspect 20, wherein transmitting the update comprises: quantizing the locally updated customization feature vector to generate a quantized update; and transmitting the quantized update.

Aspect 22: The method Aspect 21, wherein the locally updated customization feature vector comprises a plurality of elements, and wherein quantizing the locally updated customization feature vector comprises quantizing each of the plurality of elements.

Aspect 23: The method of either of Aspects 21 or 22, further comprising determining an indication of a bit size corresponding to the quantized update, wherein the quantized update comprises a fixed bit number, and wherein the fixed bit number comprises the bit size.

Aspect 24: The method of Aspect 23, wherein the indication of the bit size is carried in at least one of: the customization feature vector configuration, a radio resource control message, a downlink control information transmission, a medium access control (MAC) control element, or a combination thereof.

Aspect 25: The method of any of Aspects 21-24, further comprising determining an indication of a maximum bit size corresponding to the quantized update, wherein the quantized update comprises a variable bit number, and wherein the variable bit number comprises a bit size that is less than or equal to the maximum bit size.

Aspect 26: The method of Aspect 25, further comprising transmitting a quantization capability indication that indicates a maximum bit size for quantization of customization feature vector updates, wherein the maximum bit size is based at least in part on the quantization capability indication.

Aspect 27: The method of either of Aspects 25 or 26, further comprising receiving a resource allocation for transmitting the update, and wherein the maximum bit size is based at least in part on the resource allocation.

Aspect 28: The method of any of Aspects 25-27, wherein the indication of the bit size is carried in at least one of: the customization feature vector configuration, a radio resource control message, a downlink control information transmission, a medium access control (MAC) control element, or a combination thereof.

Aspect 29: The method of any of Aspects 21-28, wherein the quantized update comprises a non-uniform quantization of one or more elements of the locally updated customization feature vector.

Aspect 30: The method of Aspect 29, further comprising receiving an indication of a non-uniform quantization scheme, wherein the non-uniform quantization is based at least in part on the indication of the non-uniform quantization scheme, wherein the non-uniform quantization scheme is carried in at least one of: the customization feature vector configuration, a radio resource control message, a downlink control information transmission, a medium access control (MAC) control element, or a combination thereof.

Aspect 31: The method of Aspect 30, further comprising transmitting a non-uniform quantization capability indication, wherein the non-uniform quantization scheme is based at least in part on the non-uniform quantization capability.

Aspect 32: The method of either of Aspects 30 or 31, further comprising transmitting a non-uniform quantization suggestion, wherein the non-uniform quantization scheme is based at least in part on the non-uniform quantization suggestion.

Aspect 33: The method of any of Aspects 1-32, further comprising: receiving a latent vector configuration that indicates a periodic reporting procedure for reporting updates corresponding to at least one latent vector; determining an update corresponding to the at least one latent vector using an additional machine learning component; and transmitting the update corresponding to the at least one latent vector based at least in part on the latent vector configuration.

Aspect 34: The method of Aspect 33, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the customization feature vector configuration indicates a second periodicity associated with reporting the updates corresponding to the at least one customization feature vector, wherein the second periodicity comprises an amount of time between consecutive transmissions of the updates corresponding to the at least one customization feature vector.

Aspect 35: The method of Aspect 34, wherein the first periodicity is smaller than the second periodicity.

Aspect 36: The method of either of Aspects 34 or 35, wherein the latent vector configuration is carried in at least one of: a radio resource control message, a medium access control (MAC) control element, or a combination thereof.

Aspect 37: The method of any of Aspects 33-36, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the customization feature vector configuration indicates a scaling factor for determining a second periodicity relative to the first periodicity, wherein the second periodicity comprises an amount of time between consecutive transmissions of the updates corresponding to the at least one customization feature vector.

Aspect 38: The method of Aspect 37, further comprising determining the second periodicity based at least in part on the first periodicity and the scaling factor.

Aspect 39: The method of Aspect 38, further comprising transmitting an indication of the second periodicity.

Aspect 40: The method of any of Aspects 37-39, wherein the scaling factor comprises an explicit scaling factor.

Aspect 41: The method of Aspect 40, wherein the customization feature vector configuration comprises a scaling factor table that maps the first periodicity to one or more second periodicity options.

Aspect 42: The method of Aspect 41, further comprising selecting the second periodicity from the one or more second periodicity options.

Aspect 43: The method of any of Aspects 37-42, wherein the scaling factor comprises an implicit scaling factor, wherein the first periodicity maps to the second periodicity.

Aspect 44: The method of any of Aspects 37-43, further comprising: identifying a collision between a scheduled transmission of an update corresponding to the at least one latent vector and a scheduled transmission of an update corresponding to the at least one customization feature vector; and transmitting the scheduled transmission of the update corresponding to the at least one customization feature vector.

Aspect 45: The method of any of Aspects 37-44, wherein the at least one customization feature vector comprises a plurality of customization feature vectors, and wherein the customization feature vector configuration indicates an ordering associated with transmitting a plurality of updates corresponding to the plurality of customization feature vectors.

Aspect 46: The method of Aspect 45, further comprising: identifying a collision between a scheduled transmission of the plurality of updates corresponding to the plurality of customization feature vectors and an additional transmission; and refraining from transmitting an end portion of a report comprising the plurality of updates corresponding to the plurality of customization feature vectors based at least in part on identifying the collision.

Aspect 47: The method of Aspect 45, further comprising: receiving a resource allocation associated with a scheduled transmission of the plurality of updates corresponding to the plurality of customization feature vectors and an additional transmission; determining that the resource allocation is insufficient to transmit a report comprising the plurality of updates corresponding to the plurality of customization feature vectors; and refraining from transmitting an end portion of the report based at least in part on determining that the resource allocation is insufficient to transmit the report.

Aspect 48: The method of any of Aspects 37-47, wherein the at least one customization feature vector comprises a plurality of customization feature vectors and wherein the at least one latent vector comprises a plurality of latent vectors, and wherein the transmitting the update comprises: transmitting, according to an ordering, a first plurality of updates, wherein the first plurality of updates correspond to the plurality of customization feature vectors; and transmitting, according to the ordering, a second plurality of updates, wherein the second plurality of updates correspond to the plurality of latent vectors.

Aspect 49: The method of Aspect 48, wherein transmitting the first plurality of updates and the second plurality of updates according to the ordering comprises transmitting the first plurality of updates prior to transmitting the second plurality of updates.

Aspect 50: The method of either of Aspects 48 or 49, wherein transmitting the first plurality of updates and the second plurality of updates according to the ordering comprises: transmitting a first update of the first plurality of updates; transmitting, after the first update, a second update of the second plurality of updates; transmitting, after transmitting the second update, a third update of the first plurality of updates; and transmitting, after transmitting the third update, a fourth update of the second plurality of updates.

Aspect 51: The method of any of Aspects 1-50, further comprising: receiving a latent vector configuration that indicates a dynamic reporting procedure for reporting updates corresponding to at least one latent vector; determining an update corresponding to the at least one latent vector using an additional machine learning component; and transmitting the update corresponding to the at least one latent vector based at least in part on the latent vector configuration.

Aspect 52: The method of Aspect 51, wherein the customization feature vector configuration comprises an indication to transmit the update corresponding to the at least one customization feature vector based at least in part on receiving a latent vector feedback request.

Aspect 53: The method of Aspect 52, wherein the latent vector feedback request is carried in at least one of: a downlink control information transmission, a medium access control (MAC) control element, or a combination thereof.

Aspect 54: The method of either of Aspects 52 or 53, wherein the latent vector feedback request comprises a trigger that triggers transmission of an update corresponding to the at least one latent vector, and wherein the trigger further triggers transmission of the update corresponding to the at least one customization feature vector.

Aspect 55: The method of any of Aspects 51-54, further comprising transmitting a feedback resource request, wherein the feedback resource request comprises a request for: a first set of resources for transmitting the update corresponding to the at least one latent vector, a second set of resources for transmitting the update corresponding to the at least one customization feature vector, or a combination thereof.

Aspect 56: The method of any of Aspects 51-55, further comprising: determining an occurrence of an update reporting trigger event; and transmitting, based at last on determining the occurrence of the update reporting trigger event, at least one of the update corresponding to the at least one customization feature vector or the update corresponding to the at least one latent vector.

Aspect 57: The method of any of Aspects 51-56, wherein determining the update corresponding to the at least one latent vector comprises determining a locally updated latent vector based at least in part on a previously reported customization feature vector.

Aspect 58: The method of any of Aspects 51-57, wherein determining the update corresponding to the at least one latent vector comprises determining a locally updated latent vector based at least in part on a default customization feature vector.

Aspect 59: The method of Aspect 58, wherein the default customization vector comprises an initial customization vector that was determined at an initialization phase.

Aspect 60: The method of Aspect 58, wherein the default customization vector comprises an initial customization vector that was determined at a setup phase.

Aspect 61: A method of wireless communication performed by a server, comprising: transmitting a customization feature vector feedback configuration associated with a reporting procedure for reporting updates corresponding to at least one customization feature vector that is based at least in part on a machine learning component and one or more features associated with an environment of a client; and receiving an update corresponding to the at least one customization feature vector based at least in part on the configuration.

Aspect 62: The method of Aspect 61, wherein the machine learning component comprises at least one neural network.

Aspect 63: The method of Aspect 62, wherein the at least one neural network comprises at least one autoencoder.

Aspect 64: The method of any of Aspects 61-63, wherein the update comprises a set of values corresponding to the at least one customization feature vector.

Aspect 65: The method of any of Aspects 61-64, wherein the update comprises a locally updated customization feature vector.

Aspect 66: The method of any of Aspects 61-65, wherein the update comprises a subset of elements of a locally updated customization feature vector that are different than a corresponding subset of elements of a previously received update.

Aspect 67: The method of any of Aspects 61-66, wherein the at least one customization feature vector comprises a plurality of customization feature vectors.

Aspect 68: The method of Aspect 67, wherein the plurality of customization feature vectors corresponds to a plurality of communication parameters.

Aspect 69: The method of Aspect 68, wherein the plurality of communication parameters indicate at least one of: a component carrier, a bandwidth part, a band, a band combination, a frequency range, a use case, a neural network identifier, or a combination thereof.

Aspect 70: The method of Aspect 69, wherein the use case comprises at least one of: a channel state information derivation, a positioning measurement derivation, demodulation of a data channel, or a combination thereof.

Aspect 71: The method of any of Aspects 68-70, wherein a first customization feature vector of the plurality of customization feature vectors corresponds to a first communication parameter of the plurality of communication parameters, and wherein a second customization feature vector of the plurality of customization feature vectors corresponds to a second communication parameter of the plurality of communication parameters.

Aspect 72: The method of any of Aspects 61-71, further comprising: receiving a capability report that indicates a number of customization feature vectors that the client can support, wherein the customization feature vector configuration is based at least in part on the capability report.

Aspect 73: The method of any of Aspects 61-70, wherein the customization feature vector configuration indicates a transmission parameter that indicates a quantity of scheduled uplink resources that can be used to carry one or more portions of the update.

Aspect 74: The method of Aspect 73, wherein the quantity of the scheduled uplink resources comprises a percentage of a set of allocated uplink resources.

Aspect 75: The method of Aspect 74, wherein the set of allocated uplink resources correspond to at least one of: a physical uplink control channel, a physical uplink shared channel, or a combination thereof.

Aspect 76: The method of any of Aspects 73-75, wherein the update comprises a decreased quantization level that is lower than an initial quantization level based at least in part on a determination that a size of the update is larger than a payload size.

Aspect 77: The method of any of Aspects 73-76, further comprising: receiving a first portion of the update in a first packet; and receiving a second portion of the update in a second packet.

Aspect 78: The method of any of Aspects 61-77, wherein the update is carried in at least one of: an uplink medium access control (MAC) control element, a radio resource control message, an uplink control information transmission, or a combination thereof.

Aspect 79: The method of any of Aspects 61-78, wherein the update comprises a locally updated customization feature vector.

Aspect 80: The method of Aspect 79, wherein the update comprises a quantized update including a plurality of quantized elements.

Aspect 81: The method of Aspect 80, further comprising transmitting an indication of a bit size, wherein the quantized update comprises a fixed bit number, and wherein the fixed bit number comprises the bit size.

Aspect 82: The method of Aspect 81, wherein the indication of the bit size is carried in at least one of: the customization feature vector configuration, a radio resource control message, a downlink control information transmission, a medium access control (MAC) control element, or a combination thereof.

Aspect 83: The method of any of Aspects 80-82, further comprising transmitting an indication of a maximum bit size corresponding to the quantized update, wherein the quantized update comprises a variable bit number, and wherein the variable bit number comprises a bit size that is less than or equal to the maximum bit size.

Aspect 84: The method of Aspect 83, further comprising receiving a quantization capability indication that indicates a maximum bit size for quantization of customization feature vector updates, wherein the maximum bit size is based at least in part on the quantization capability indication.

Aspect 85: The method of either of Aspects 83 or 84, further comprising transmitting a resource allocation for transmitting the update, and wherein the maximum bit size is based at least in part on the resource allocation.

Aspect 86: The method of any of Aspects 83-85, wherein the indication of the maximum bit size is carried in at least one of: the customization feature vector configuration, a radio resource control message, a downlink control information transmission, a medium access control (MAC) control element, or a combination thereof.

Aspect 87: The method of any of Aspects 80-86, wherein the quantized update comprises a non-uniform quantization of one or more elements of the locally updated customization feature vector.

Aspect 88: The method of Aspect 87, further comprising transmitting an indication of a non-uniform quantization scheme, wherein the non-uniform quantization is based at least in part on the indication of the non-uniform quantization scheme, wherein the non-uniform quantization scheme is carried in at least one of: the customization feature vector configuration, a radio resource control message, a downlink control information transmission, a medium access control (MAC) control element, or a combination thereof.

Aspect 89: The method of Aspect 88, further comprising receiving a non-uniform quantization capability indication, wherein the non-uniform quantization scheme is based at least in part on the non-uniform quantization capability.

Aspect 90: The method of either of Aspects 88 or 89, further comprising receiving a non-uniform quantization suggestion, wherein the non-uniform quantization scheme is based at least in part on the non-uniform quantization suggestion.

Aspect 91: The method of any of Aspects 61-90, further comprising: transmitting a latent vector configuration that indicates a periodic reporting procedure for reporting updates corresponding to at least one latent vector; and receiving an update corresponding to the at least one latent vector based at least in part on the latent vector configuration.

Aspect 92: The method of Aspect 91, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the customization feature vector configuration indicates a second periodicity associated with reporting the updates corresponding to the at least one customization feature vector, wherein the second periodicity comprises an amount of time between consecutive transmissions of the updates corresponding to the at least one customization feature vector.

Aspect 93: The method of Aspect 92, wherein the first periodicity is smaller than the second periodicity.

Aspect 94: The method of any of Aspects 91-93, wherein the latent vector configuration is carried in at least one of: a radio resource control message, a medium access control (MAC) control element, or a combination thereof.

Aspect 95: The method of any of Aspects 91-94, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the customization feature vector configuration indicates a scaling factor for determining a second periodicity relative to the first periodicity, wherein the second periodicity comprises an amount of time between consecutive transmissions of the updates corresponding to the at least one customization feature vector.

Aspect 96: The method of Aspect 95, further comprising receiving an indication of the second periodicity.

Aspect 97: The method of either of Aspects 95 or 96, wherein the scaling factor comprises an explicit scaling factor.

Aspect 98: The method of Aspect 97, wherein the customization feature vector configuration comprises a scaling factor table that maps the first periodicity to one or more second periodicity options.

Aspect 99: The method of any of Aspects 95-98, wherein the scaling factor comprises an implicit scaling factor, wherein the first periodicity maps to the second periodicity.

Aspect 100: The method of any of Aspects 91-99, wherein the at least one customization feature vector comprises a plurality of customization feature vectors, and wherein the customization feature vector configuration indicates an ordering associated with transmitting a plurality of updates corresponding to the plurality of customization feature vectors.

Aspect 101: The method of any of Aspects 91-100, wherein the at least one customization feature vector comprises a plurality of customization feature vectors and wherein the at least one latent vector comprises a plurality of latent vectors, and wherein the receiving the update comprises: receiving, according to an ordering, a first plurality of updates, wherein the first plurality of updates correspond to the plurality of customization feature vectors; and receiving, according to the ordering, a second plurality of updates, wherein the second plurality of updates correspond to the plurality of latent vectors.

Aspect 102: The method of Aspect 101, wherein receiving the first plurality of updates and the second plurality of updates according to the ordering comprises receiving the first plurality of updates prior to receiving the second plurality of updates.

Aspect 103: The method of either of Aspects 101 or 102, wherein receiving the first plurality of updates and the second plurality of updates according to the ordering comprises: receiving a first update of the first plurality of updates; receiving, after receiving the first update, a second update of the second plurality of updates; receiving, after receiving the second update, a third update of the first plurality of updates; and receiving, after receiving the third update, a fourth update of the second plurality of updates.

Aspect 104: The method of any of Aspects 61-103, further comprising: transmitting a latent vector configuration that indicates a dynamic reporting procedure for reporting updates corresponding to at least one latent vector; and receiving an update corresponding to the at least one latent vector based at least in part on the latent vector configuration.

Aspect 105: The method of Aspect 104, wherein the customization feature vector configuration comprises an indication to transmit the update corresponding to the at least one customization feature vector based at least in part on receiving a latent vector feedback request.

Aspect 106: The method of Aspect 105, wherein the latent vector feedback request is carried in at least one of: a downlink control information transmission, a medium access control (MAC) control element, or a combination thereof.

Aspect 107: The method of either of Aspects 105 or 106, wherein the latent vector feedback request comprises a trigger that triggers transmission of an update corresponding to the at least one latent vector, and wherein the trigger further triggers transmission of the update corresponding to the at least one customization feature vector.

Aspect 108: The method of any of Aspects 105-107, further comprising receiving a feedback resource request, wherein the feedback resource request comprises a request for: a first set of resources for transmitting the update corresponding to the at least one latent vector, a second set of resources for transmitting the update corresponding to the at least one customization feature vector, or a combination thereof.

Aspect 109: The method of any of Aspects 105-107, further comprising receiving, based at last on a determination of an occurrence of an update reporting trigger event, at least one of the update corresponding to the at least one customization feature vector or the update corresponding to the at least one latent vector.

Aspect 110: The method of any of Aspects 105-109, wherein the update corresponding to the at least one latent vector comprises a locally updated latent vector based at least in part on a previously reported customization feature vector.

Aspect 111: The method of any of Aspects 105-110, wherein the update corresponding to the at least one latent vector comprises a locally updated latent vector based at least in part on a default customization feature vector.

Aspect 112: The method of Aspect 111, wherein the default customization vector comprises an initial customization vector that was determined at an initialization phase.

Aspect 113: The method of either of Aspects 111 or 112, wherein the default customization vector comprises an initial customization vector that was determined at a setup phase.

Aspect 114: An apparatus for wireless communication at a device, comprising a processor; memory coupled with the processor; and instructions stored in the memory and executable by the processor to cause the apparatus to perform the method of one or more of Aspects 1-60.

Aspect 115: A device for wireless communication, comprising a memory and one or more processors coupled to the memory, the one or more processors configured to perform the method of one or more of Aspects 1-60.

Aspect 116: An apparatus for wireless communication, comprising at least one means for performing the method of one or more of Aspects 1-60.

Aspect 117: A non-transitory computer-readable medium storing code for wireless communication, the code comprising instructions executable by a processor to perform the method of one or more of Aspects 1-60.

Aspect 118: A non-transitory computer-readable medium storing a set of instructions for wireless communication, the set of instructions comprising one or more instructions that, when executed by one or more processors of a device, cause the device to perform the method of one or more of Aspects 1-60.

Aspect 119: An apparatus for wireless communication at a device, comprising a processor; memory coupled with the processor; and instructions stored in the memory and executable by the processor to cause the apparatus to perform the method of one or more of Aspects 61-113.

Aspect 120: A device for wireless communication, comprising a memory and one or more processors coupled to the memory, the one or more processors configured to perform the method of one or more of Aspects 61-113.

Aspect 121: An apparatus for wireless communication, comprising at least one means for performing the method of one or more of Aspects 61-113.

Aspect 122: A non-transitory computer-readable medium storing code for wireless communication, the code comprising instructions executable by a processor to perform the method of one or more of Aspects 61-113.

Aspect 123: A non-transitory computer-readable medium storing a set of instructions for wireless communication, the set of instructions comprising one or more instructions that, when executed by one or more processors of a device, cause the device to perform the method of one or more of Aspects 61-113.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a client, comprising:

one or more memories; and one or more processors, coupled to the one or more memories, configured to cause the apparatus to:

receive a customization feature vector feedback configuration associated with a reporting procedure for reporting updates corresponding to at least one customization feature vector, wherein the at least one customization feature vector is an output of a machine learning component, the machine learning component being configured to receive, as input, one or more features associated with an environment of the client;

determine an update corresponding to the at least one customization feature vector using the machine learning component; and transmit the update based at least in part on the customization feature vector feedback configuration, wherein the one or more processors are further configured to cause the apparatus to:

receive a latent vector configuration that indicates a periodic reporting procedure for reporting updates corresponding to at least one latent vector;

determine an update corresponding to the at least one latent vector using an additional machine learning component; and transmit the update corresponding to the at least one latent vector based at least in part on the latent vector configuration, wherein:

the latent vector configuration indicates a first periodicity associated with reporting updates corresponding to the at least one latent vector, the first periodicity comprises an amount of time between consecutive transmissions of the updates corresponding to the at least one latent vector, the customization feature vector configuration indicates a second periodicity associated with reporting the updates corresponding to the at least one customization feature vector, or the customization feature vector configuration indicates a scaling factor for determining the second periodicity relative to the first periodicity, and the second periodicity comprises an amount of time between consecutive transmissions of the updates corresponding to the at least one customization feature vector.

2. The apparatus of claim 1, wherein the update comprises a locally updated customization feature vector.

3. The apparatus of claim 1, wherein the at least one customization feature vector comprises a plurality of customization feature vectors.

4. The apparatus of claim 3, wherein the plurality of customization feature vectors corresponds to a plurality of communication parameters.

5. The apparatus of claim 4, wherein the plurality of communication parameters indicate at least one of:

a component carrier, a bandwidth part, a band, a band combination, a frequency range, a use case, a neural network identifier, or a combination thereof.

6. The apparatus of claim 5, wherein the plurality of communication parameters indicate at least the use case and wherein the use case comprises at least one of:

a channel state information derivation, a positioning measurement derivation, demodulation of a data channel, or a combination thereof.

7. The apparatus of claim 1, wherein the one or more processors are further configured to cause the apparatus to:

transmit a capability report that indicates a number of customization feature vectors that the client is configured to support, wherein the customization feature vector configuration is based at least in part on the capability report.

8. The apparatus of claim 1, wherein the customization feature vector configuration indicates a transmission parameter that indicates a quantity of scheduled uplink resources that are configured to carry one or more portions of the update.

9. The apparatus of claim 1, wherein determining the update comprises determining a locally updated customization feature vector, and the one or more processors, to transmit the update, are configured to cause the apparatus to:

quantize the locally updated customization feature vector to generate a quantized update; and transmit the quantized update.

10. The apparatus of claim 9, wherein the one or more processors are further configured to cause the apparatus to determine an indication of a maximum bit size corresponding to the quantized update, wherein the quantized update comprises a variable bit number, and wherein the variable bit number comprises a bit size that is less than or equal to the maximum bit size.

11. The apparatus of claim 9, wherein the quantized update comprises a non-uniform quantization of one or more elements of the locally updated customization feature vector, wherein the one or more processors are further configured to cause the apparatus to receive an indication of a non-uniform quantization scheme, wherein the non-uniform quantization is based at least in part on the indication of the non-uniform quantization scheme, wherein the non-uniform quantization scheme is carried in at least one of:

the customization feature vector configuration, a radio resource control message, a downlink control information transmission, a medium access control (MAC) control element, or a combination thereof.

12. The apparatus of claim 11, wherein the one or more processors are further configured to cause the apparatus to transmit a non-uniform quantization suggestion, wherein the non-uniform quantization scheme is based at least in part on the non-uniform quantization suggestion.

13. The apparatus of claim 1, wherein the customization feature vector configuration indicates the second periodicity associated with reporting the updates corresponding to the at least one customization feature vector.

14. The apparatus of claim 1, wherein the customization feature vector configuration indicates the scaling factor for determining the second periodicity relative to the first periodicity.

15. The apparatus of claim 14, wherein the one or more processors are further configured to cause the apparatus to:

identify a collision between a scheduled transmission of an update corresponding to the at least one latent vector and a scheduled transmission of an update corresponding to the at least one customization feature vector; and transmit the scheduled transmission of the update corresponding to the at least one customization feature vector.

16. The apparatus of claim 14, wherein the at least one customization feature vector comprises a plurality of customization feature vectors, and wherein the customization feature vector configuration indicates an ordering associated with transmitting a plurality of updates corresponding to the plurality of customization feature vectors.

17. The apparatus of claim 16, wherein the one or more processors are further configured to cause the apparatus to:

identify a collision between a scheduled transmission of the plurality of updates corresponding to the plurality of customization feature vectors and an additional transmission; and refrain from transmitting an end portion of a report comprising the plurality of updates corresponding to the plurality of customization feature vectors based at least in part on identifying the collision.

18. The apparatus of claim 16, wherein the one or more processors are further configured to cause the apparatus to:

receive a resource allocation associated with a scheduled transmission of the plurality of updates corresponding to the plurality of customization feature vectors and an additional transmission;

determine that the resource allocation is insufficient to transmit a report comprising the plurality of updates corresponding to the plurality of customization feature vectors; and refrain from transmitting an end portion of the report based at least in part on determining that the resource allocation is insufficient to transmit the report.

19. The apparatus of claim 14, wherein the at least one customization feature vector comprises a plurality of customization feature vectors and wherein the at least one latent vector comprises a plurality of latent vectors, and wherein the one or more processes, to transmit the update, are configured to cause the apparatus to:

transmit, according to an ordering, a first plurality of updates, wherein the first plurality of updates correspond to the plurality of customization feature vectors; and transmit, according to the ordering, a second plurality of updates, wherein the second plurality of updates correspond to the plurality of latent vectors.

20. The apparatus of claim 1, wherein the one or more processors are further configured to cause the apparatus to:

receive a latent vector configuration that indicates a dynamic reporting procedure for reporting updates corresponding to at least one latent vector;

determine an update corresponding to the at least one latent vector using an additional machine learning component; and transmit the update corresponding to the at least one latent vector based at least in part on the latent vector configuration.

21. The apparatus of claim 20, wherein the customization feature vector configuration comprises an indication to transmit the update corresponding to the at least one customization feature vector based at least in part on receiving a latent vector feedback request.

22. The apparatus of claim 21, wherein the latent vector feedback request comprises a trigger that triggers transmission of an update corresponding to the at least one latent vector, and wherein the trigger further triggers transmission of the update corresponding to the at least one customization feature vector.

23. The apparatus of claim 20, wherein the one or more processors are further configured to cause the apparatus to transmit a feedback resource request, wherein the feedback resource request comprises a request for:

a first set of resources for transmitting the update corresponding to the at least one latent vector, a second set of resources for transmitting the update corresponding to the at least one customization feature vector, or a combination thereof.

24. The apparatus of claim 20, wherein the one or more processors are further configured to cause the apparatus to:

determine an occurrence of an update reporting trigger event; and transmit, based at last on determining the occurrence of the update reporting trigger event, at least one of the update corresponding to the at least one customization feature vector or the update corresponding to the at least one latent vector.

25. The apparatus of claim 20, wherein the one or more processors, to determine the update corresponding to the at least one latent vector, are configured to cause the apparatus to determine a locally updated latent vector based at least in part on a previously reported customization feature vector.

26. The apparatus of claim 20, wherein the one or more processors, to determine the update corresponding to the at least one latent vector, are configured to cause the apparatus to determine a locally updated latent vector based at least in part on a default customization feature vector.

27. An apparatus for wireless communication at a server, comprising:

one or more memories; and one or more processors, coupled to the one or more memories, configured to cause the apparatus to:

transmit a customization feature vector feedback configuration associated with a reporting procedure for reporting updates corresponding to at least one customization feature vector, wherein the at least one customization feature vector is an output of a machine learning component, the machine learning component being configured to receive, as input, one or more features associated with an environment of a client; and receive an update corresponding to the at least one customization feature vector based at least in part on the configuration, wherein the one or more processors are further configured to cause the apparatus to:

transmit a latent vector configuration that indicates a periodic reporting procedure for reporting updates corresponding to at least one latent vector; and receive an update corresponding to the at least one latent vector, wherein:

the latent vector configuration indicates a first periodicity associated with reporting updates corresponding to the at least one latent vector, the first periodicity comprises an amount of time between consecutive transmissions of the updates corresponding to the at least one latent vector, the customization feature vector configuration indicates a second periodicity associated with reporting the updates corresponding to the at least one customization feature vector, or the customization feature vector configuration indicates a scaling factor for determining the second periodicity relative to the first periodicity, and the second periodicity comprises an amount of time between consecutive transmissions of the updates corresponding to the at least one customization feature vector.

28. A method of wireless communication performed by a client, comprising:

receiving a customization feature vector feedback configuration associated with a reporting procedure for reporting updates corresponding to at least one customization feature vector, wherein the at least one customization feature vector is an output of a machine learning component, the machine learning component being configured to receive, as input, one or more features associated with an environment of the client;

determining an update corresponding to the at least one customization feature vector using the machine learning component; and transmitting the update based at least in part on the customization feature vector feedback configuration, wherein the method further comprises:

receiving a latent vector configuration that indicates a periodic reporting procedure for reporting updates corresponding to at least one latent vector;

determining an update corresponding to the at least one latent vector using an additional machine learning component; and transmitting the update corresponding to the at least one latent vector based at least in part on the latent vector configuration, wherein:

the latent vector configuration indicates a first periodicity associated with reporting updates corresponding to the at least one latent vector, the first periodicity comprises an amount of time between consecutive transmissions of the updates corresponding to the at least one latent vector, the customization feature vector configuration indicates a second periodicity associated with reporting the updates corresponding to the at least one customization feature vector, or the customization feature vector configuration indicates a scaling factor for determining the second periodicity relative to the first periodicity, and the second periodicity comprises an amount of time between consecutive transmissions of the updates corresponding to the at least one customization feature vector.

29. A method of wireless communication performed by a server, comprising:

transmitting a customization feature vector feedback configuration associated with a reporting procedure for reporting updates corresponding to at least one customization feature vector, wherein the at least one customization feature vector is an output of a machine learning component, the machine learning component being configured to receive, as input, one or more features associated with an environment of a client; and receiving an update corresponding to the at least one customization feature vector based at least in part on the configuration, wherein the method further comprises:

transmitting a latent vector configuration that indicates a periodic reporting procedure for reporting updates corresponding to at least one latent vector; and receiving an update corresponding to the at least one latent vector, wherein:

the latent vector configuration indicates a first periodicity associated with reporting updates corresponding to the at least one latent vector, the first periodicity comprises an amount of time between consecutive transmissions of the updates corresponding to the at least one latent vector, the customization feature vector configuration indicates a second periodicity associated with reporting the updates corresponding to the at least one customization feature vector, or the customization feature vector configuration indicates a scaling factor for determining the second periodicity relative to the first periodicity, and the second periodicity comprises an amount of time between consecutive transmissions of the updates corresponding to the at least one customization feature vector.

30. The method of claim 28, wherein the customization feature vector configuration indicates the second periodicity associated with reporting the updates corresponding to the at least one customization feature vector.

31. The method of claim 28, wherein the customization feature vector configuration indicates the scaling factor for determining the second periodicity relative to the first periodicity.

* * * * *